US00RE46529E

(19) United States
(12) Reissued Patent
Lee et al.

(10) Patent Number: US RE46,529 E
(45) Date of Reissued Patent: Aug. 29, 2017

(54) METHOD FOR TRANSMITTING AND RECEIVING DATA WITH SUPERFRAME STRUCTURE

(71) Applicant: LG ELECTRONICS INC., Seoul (KR)

(72) Inventors: Wook Bong Lee, Gyeonggi-do (KR); Bin Chul Ihm, Gyeonggi-do (KR); Yong Ho Kim, Gyeonggi-do (KR); Jin Sam Kwak, Gyeonggi-do (KR); Ki Seon Ryu, Gyeonggi-do (KR); Jin-Young Chun, Gyeonggi-do (KR); Young Soo Yuk, Gyeonggi-do (KR)

(73) Assignee: LG ELECTRONICS INC., Seoul (KR)

(21) Appl. No.: 14/469,339

(22) Filed: Aug. 26, 2014

Related U.S. Patent Documents

Reissue of:
(64) Patent No.: 8,134,965
Issued: Mar. 13, 2012
Appl. No.: 12/180,426
Filed: Jul. 25, 2008

U.S. Applications:
(63) Continuation of application No. 14/152,844, filed on Jan. 10, 2014, now abandoned, which is an application for the reissue of Pat. No. 8,134,965.
(Continued)

(30) Foreign Application Priority Data

Oct. 9, 2007 (KR) ..... 10-2007-0101689
May 2, 2008 (KR) ..... 10-2008-0041283
May 6, 2008 (KR) ..... 10-2008-0041913

(51) Int. Cl.
*H04W 4/00* (2009.01)
*H04W 28/06* (2009.01)
*H04L 12/64* (2006.01)

(52) U.S. Cl.
CPC ..... *H04W 28/06* (2013.01); *H04L 2012/6462* (2013.01); *Y02B 60/50* (2013.01)

(58) Field of Classification Search
CPC ..... H04L 2012/6462; H04W 28/06
(Continued)

(56) References Cited

U.S. PATENT DOCUMENTS 5,684,791 A 11/1997 Raychaudhuri et al.
6,252,868 B1 * 6/2001 Diachina et al. ..... 370/347
(Continued)

OTHER PUBLICATIONS

Bacioccola et al., "A Downlink Data Region Allocation Algorithm for IEEE 802.16e OFDMA," 6th IEEE International Conference on Information, Communications & Signal Processing ICICS 2007, Dec. 10-13, 2007, 5 pages.
(Continued)

*Primary Examiner* — Matthew Heneghan
(74) *Attorney, Agent, or Firm* — Birch, Stewart, Kolasch & Birch, LLP

(57) ABSTRACT

A method of transmitting and receiving data using a superframe structure is disclosed. A method for transmitting data through a superframe including a superframe header, includes generating the superframe which includes a data region including user data and includes a dedicated control region including data region allocation information indicating resource allocation for the data region, and transmitting the superframe. The dedicated control region is arranged at at least one of locations except for a subframe of the superframe header. A user equipment which does not have to transmit and receive data decodes only data region allocation information using information of the data region indicated by a dedicated control region, thereby minimizing power loss, reducing a feedback delay, and reducing system overhead using a superframe structure.

1 Claim, 29 Drawing Sheets

Related U.S. Application Data

(60) Provisional application No. 60/951,961, filed on Jul. 26, 2007, provisional application No. 61/036,480, filed on Mar. 14, 2008.

(58) Field of Classification Search
USPC ..... 370/349
See application file for complete search history.

(56) References Cited

U.S. PATENT DOCUMENTS

| | | | | |
|---|---|---|---|---|
| 6,907,020 | B2 | 6/2005 | Periyalwar et al. | |
| 6,917,603 | B2 | 7/2005 | Strawczynski et al. | |
| 6,980,540 | B1 | 12/2005 | Laroia et al. | |
| 7,227,854 | B2 | 6/2007 | Kim et al. | |
| 7,463,600 | B2 | 12/2008 | Tong et al. | |
| 8,009,685 | B2 | 8/2011 | Himmanen et al. | |
| 8,134,965 | B2 | 3/2012 | Lee et al. | |
| 8,520,620 | B2 | 8/2013 | Ji et al. | |
| 8,547,926 | B2 | 10/2013 | Yuk et al. | |
| 8,605,569 | B2 | 12/2013 | Olszewski et al. | |
| 8,644,270 | B2 | 2/2014 | Park et al. | |
| 8,934,407 | B2 | 1/2015 | Chion et al. | |
| 2001/0033560 | A1* | 10/2001 | Tong et al. | 370/337 |
| 2004/0258092 | A1 | 12/2004 | Sugaya | |
| 2006/0092875 | A1 | 5/2006 | Yang et al. | |
| 2006/0126553 | A1 | 6/2006 | Lim et al. | |
| 2006/0229075 | A1 | 10/2006 | Kim et al. | |
| 2007/0047432 | A1 | 3/2007 | Cho et al. | |
| 2007/0058595 | A1 | 3/2007 | Classon et al. | |
| 2007/0064669 | A1 | 3/2007 | Classon et al. | |
| 2007/0086474 | A1 | 4/2007 | Lee et al. | |
| 2007/0115890 | A1 | 5/2007 | Yi et al. | |
| 2007/0140167 | A1 | 6/2007 | Jang et al. | |
| 2008/0075032 | A1* | 3/2008 | Balachandran et al. | 370/317 |
| 2008/0101213 | A1 | 5/2008 | Mohanty et al. | |
| 2008/0186939 | A1 | 8/2008 | Kim et al. | |
| 2009/0168716 | A1 | 7/2009 | Moon et al. | |
| 2010/0046464 | A1 | 2/2010 | Kwak et al. | |
| 2011/0026419 | A1 | 2/2011 | Kim et al. | |

OTHER PUBLICATIONS

Eklund et al., "IEEE Standard 802.16: A Technical Overview of the WirelessMAN™ Air Interface for Broadband Wireless Access," IEEE Communications Magazine, Jun. 2002, pp. 98-107.

Lebrun et al., "Feasibility Study of the Mesh Extension for the IEEE 802.16e Communication System," 13th Annual IEEE Symposium on Communications and Vehicular Technology IEEE SCVT 2006, Nov. 2006, pp. 93-96.

Lee et al., "IEEE 802.16m Requirements," downloaded from the IEEE 802.16 Broadband Wireless Access Working Group, Jan. 12, 2007, pp. 0-6 (7 pages), http://ieee802.org/16.

Lee et al., Machine Translation of Korean Unexamined Patent No. KR-10-2009-0012039, Feb. 2, 2009.

Li et al., "TDD Frame Structures for Legacy Support in 16m," downloaded from the IEEE 802.16 Broadband Wireless Access Working Group, Nov. 6, 2007, pp. 1-8, http://ieee802.org/16.

Marks et al., "802.16m Frame Structure to Enable Legacy Support, Technology Evolution, and Reduced Latency," downloaded from the IEEE 802.16 Broadband Wireless Access Working Group, Nov. 7, 2007, pp. 1-7, http://ieee802.org/16.

Moon et al., "Frame Structure with Multiple Sub-Frame Sizes," downloaded from the IEEE 802.16 Broadband Wireless Access Working Group, May 5, 2008, pp. 1-10, http://ieee802.org/16.

Ohseki et al., "Burst Construction and Packet Mapping Scheme for OFDMA Downlinks in IEEE 802.16 systems," 50th Annual IEEE Global Communications Conference, IEEE GLOBECOM 2007 proceedings, Nov. 26-30, 2007, pp. 4307-4311.

Olszewski et al., "Brick-Tessellated Frame Structures for 802.16m OFDMA Systems," downloaded from the IEEE 802.16 Broadband Wireless Access Working Group, Jan. 16, 2008, pp. 1-24, http://ieee802.org/16.

Tao et al., "Downlink Control Design for 16m Hierarchical Frame Structure," downloaded from the IEEE 802.16 Broadband Wireless Access Working Group, Mar. 10, 2008, 10 pages, http://ieee802.org/16.

Written Opinion of the International Searching Authority (Form PCT/ISA/237), dated Feb. 4, 2009, for International Application No. PCT/KR2008/004367.

* cited by examiner

METHOD FOR TRANSMITTING AND RECEIVING DATA WITH SUPERFRAME STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[Pursuant to 35 U.S.C. §119, the present] *This* application *is a continuation reissue of U.S. Reissue application Ser. No. 14/152,844, filed on Jan. 10, 2014, currently pending, which is a reissue of U.S. Pat. No. 8,134,965 B2, which issued on Mar. 13, 2012, from U.S. patent application Ser. No. 12/180, 426, filed on Jul. 25, 2008, which* claims the benefit of earlier filing date and right of priority to *Korean Application No. 10-2007-0101689, filed Oct. 9, 2007, Korean Application No. 10-2008-0041283, filed May 2, 2008 and Korean Application No. 10-2008-0041913, filed May 6, 2008 and also claims the benefit of* Provisional Application No. 60/951, 961, filed Jul. 26, 2007, *and* Provisional Application No. 61/036,480, filed Mar. 14, 2008, [and Korean application number 10-2007-0101689, filed Oct. 9, 2007, Korean application number 10-2008-0041283, filed May 2, 2008 and Korean application number 10-2008-0041913, filed May 6, 2008 and] the contents of which are *all* hereby incorporated by reference herein in their entirety.

TECHNICAL FIELD

The present invention relates to a wireless access system, and more particularly, to a method for transmitting or receiving data using a superframe structure which is capable of reducing power loss and overhead.

BACKGROUND ART

A general wireless communication system provides one or more shared resources to multiple users. For example, the wireless communication system may employ a variety of multiple access schemes, such as code division multiple access (CDMA), time division multiple access (TDMA), and frequency division multiple access (FDMA).

Generally, a base station schedules wireless resources. The wireless resources are uplink resources in an uplink and downlink resources in a downlink. In the downlink, the base station informs a user equipment of downlink resources allocated to a data stream and the user equipment receives the data stream through the downlink resources. In the uplink, the base station informs the user equipment of uplink resources allocated to a data stream and the user equipment transmits the data stream through the uplink resources.

The amount of the wireless resources allocated varies according to the amount of data streams to be transmitted, a channel state, or quality of service (QoS). The more the amount of data streams is, the more wireless resources must be allocated. However, since the amount of wireless resources is limited, it is necessary to efficiently allocate the wireless resources.

Information as to allocation of the wireless resources must repeatedly be provided to the user equipment, because the user equipment must know information as to allocation of wireless resources in an uplink or downlink to receive data streams. The information as to wireless resource allocation indicates a control signal and is transmitted to the user equipment through a dedicated control channel or a common control channel. The dedicated control channel refers to a control channel for a specific user equipment and the common control channel refers to a control channel for all user equipments within an application region.

When data is transmitted through the common control channel or the dedicated control channel in every transmission frame, system overhead is increased by an excessive MAP header. Therefore, it is necessary to increase a transmission period of the common control channel. Moreover, since a user equipment which does not have to transmit and receive data must decode the dedicated control channel and data in all unnecessary data regions, the user equipment suffers power loss. A system having a long transmission frame increases a feedback delay more than a system having a short transmission frame. Such a feedback delay may cause degradation of link adaptability performance.

DISCLOSURE

Technical Problem

An object of the present invention devised to solve the problem is to provide a superframe structure which is capable of reducing a MAP header of a transmission frame and reducing communication power.

Another object of the present invention devised to solve the problem is to provide a method for transmitting data using the superframe structure.

A further object of the present invention devised to solve the problem is to provide a method for receiving data of a superframe by a user equipment.

Technical Solution

The object of the present invention can be achieved by providing a superframe structure including a superframe header. The superframe structure includes: a data region including user data; a dedicated control region including data region allocation information indicating resource allocation for the data region; and information as to a location of a feedback channel through which channel information of a downlink is transmitted. The dedicated control region may be arranged at least one of locations except for a subframe of the superframe header. The superframe structure may include a common control region arranged at the superframe header. At least one subframe may be arranged between the data region and the dedicated control region, and the feedback channel may precede the dedicated control region by a prescribed number of subframes.

The common control region may include information as to a start location of a subframe at which the data region is started. The common control region may include a BCH. The start location may be 0 or more.

Further, the common control region may include information as to a number of successive subframes from the start location. The number of successive subframes may be 1, 2 or more.

Further, a feedback channel may be located ahead of the dedicated control region by a prescribed number of subframes.

In another aspect of the present invention, provided herein is a method of transmitting data through a superframe including a superframe header, comprising: generating the superframe which includes a data region including user data and includes a dedicated control region including data region allocation information indicating resource allocation for the data region; and transmitting the superframe. The dedicated control region may be arranged at least one of locations except for a subframe of the superframe header.

The dedicated control region may precede the superframe header and include information allocating available resources between a location of the dedicated control region and a location of the superframe header to the data region.

The dedicated control region of a new region such as IEEE 802.16m may be arranged in at least one subframe of subframes except for a legacy region including a legacy preamble of IEEE 802.16e.

The dedicated control region may be arranged in subframes which are different according to a band.

The data region allocation information may include at least one of a location of a subframe at which the data region is started and the number of subframes belonging to the data region.

The superframe header may further include a common control region to transmit information as to subframes managed by the dedicated control region.

The superframe header may further include a common control region including information as to a location of a feedback channel through which channel information of a downlink is transmitted, and the feedback channel may precede the dedicated control region by a prescribed number of subframes.

In a further aspect of the present invention, provided herein is a method for receiving data using a superframe structure, comprising: receiving information as to a location of a feedback channel through the common control region; transmitting downlink channel information through the feedback channel; and receiving resource allocation information as to resources scheduled according to the downlink channel information through the dedicated control region. The dedicated control region may be arranged at least one of locations except for a subframe of the superframe header.

The dedicated control region may precede the superframe header and include information allocating available resources between a location of the dedicated control region and a location of the superframe header to the data region.

The dedicated control region of a new region such as IEEE 802.16m may be arranged in at least one subframe of subframes except for a legacy region including a legacy preamble of IEEE 802.16e.

The dedicated control region may be arranged at locations of subframes which are different according to a band.

Advantageous Effects

According to exemplary embodiments of the present invention, a user equipment which does not have to transmit and receive data decodes only data region allocation information using information of the data region indicated by a dedicated control region, thereby minimizing power loss, reducing a feedback delay, and reducing system overhead using a superframe structure.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description is intended to explain exemplary embodiments of the present invention, rather than to show the only embodiments that can be implemented according to the invention.

Figure 1:
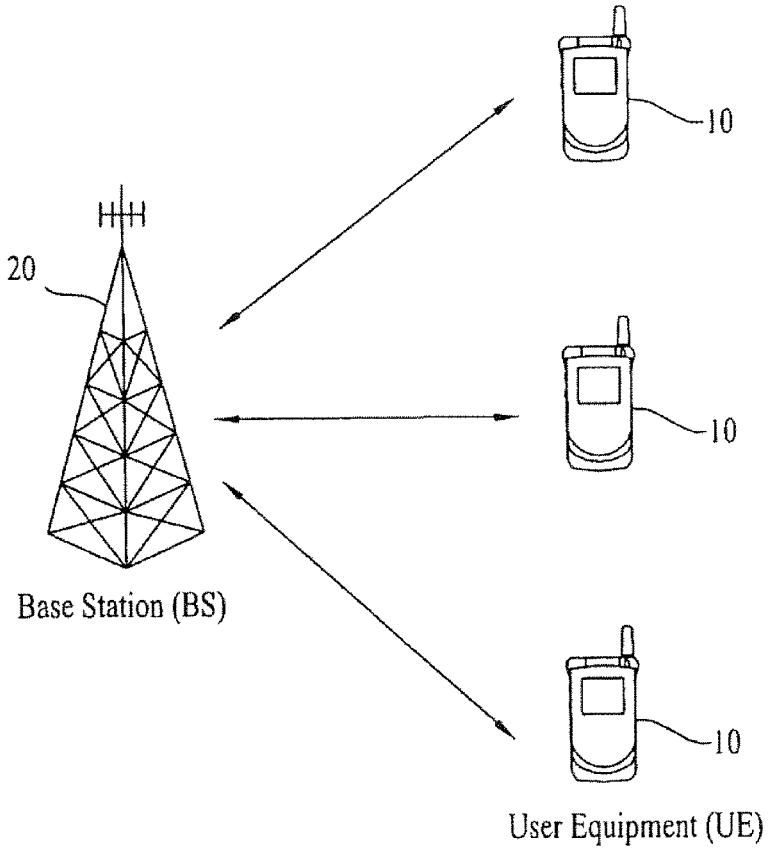
FIG. 1 is a block diagram illustrating a wireless communication system.

FIG. 1 is a block diagram illustrating a wireless communication system.

The wireless communication system is widely used to provide various communication services such as voice and packet data. The wireless communication system includes user equipments (UEs) 10 and a base station (BS) 20. Each user equipment 10 may be fixed or mobile. The user equipment 10 may be referred to by other terms such as a mobile station (MS), a user terminal (UT), a subscriber station (SS), or a wireless device. The base station 20 refers to a fixed station communicating with the user equipments 10 and may be referred to by other terms such as a Node-B, a base transceiver system (BTS), or an access point. One or more cells exist in one base station 20.

Hereinbelow, a downlink refers to communication from the base station 20 to the user equipments 10 and an uplink refers to communication from the user equipments 10 to the base station 20. In a downlink, a transmitter may be a part of the base station 20 and a data receiver may be a part of the user equipments 10. In an uplink, a transmitter may be a part of the user equipments 10 and a data receiver may be a part of the base station 20.

Multiple access schemes for downlink transmission and uplink transmission may be different from each other. For example, an orthogonal frequency division multiple access (OFDMA) scheme may be used for downlink transmission and a single carrier-frequency division multiple access (SC-FDMA) scheme may be used for uplink transmission.

The multiple access scheme applied to the wireless communication system is not limited. For example, CDMA, TDMA, FDMA, SC-FDMA, OFDMA, or other known modulation techniques, based on a multiple access scheme may be used. The above modulation schemes demodulate signals received from multiple users of the communication system, thereby increasing capacity of the communication system.

Figure 2:
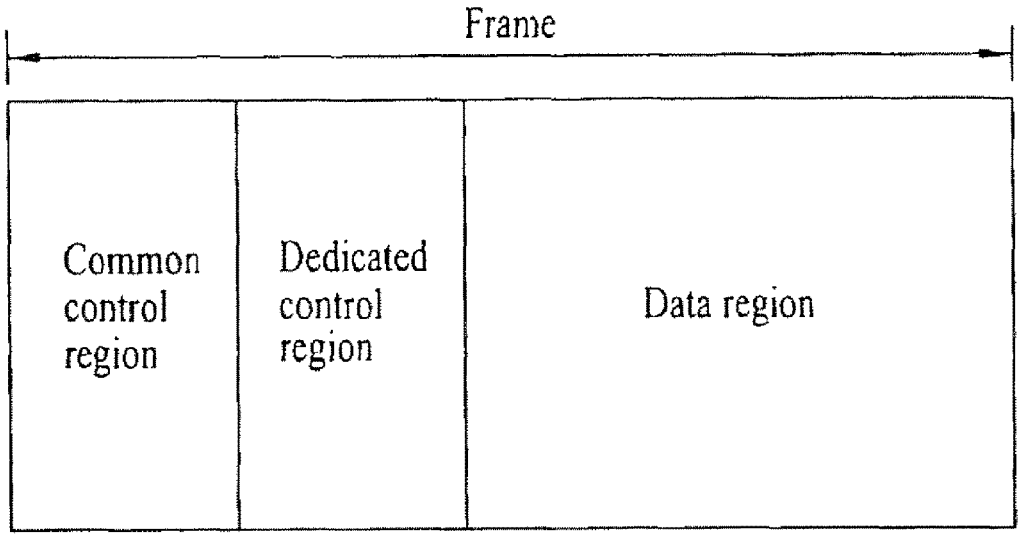
FIG. 2 illustrates an example of a frame structure.

FIG. 2 illustrates an example of a frame structure. The frame structure of FIG. 2 may be applied to a frequency division duplex (FDD) scheme and a time division duplex (TDD) scheme.

The frame structure includes a common control region, a dedicated control region, and a data region.

The control regions serve to transmit control signals only and control channels are generally allocated thereto. The data area serves to transmit data and a data channel is generally allocated thereto. The control channel transmits control signals and the data channel transmits user data. The control channel and data channel may be constructed by one frame. The control signals indicate signals which are not user data and include an acknowledgement (ACK)/negative-acknowledgement (NACK) signal, a channel quality indicator (CQI), a preceding matrix index (PMI), a rank indicator (RI), a scheduling request signal, etc.

Unlike in the control regions, both user data and control signals may be transmitted in the data region. That is, when a user equipment transmits only the control signal, the control channel may be allocated, so that the control signal is transmitted through the control channel. When the user equipment transmits data and control signals, the data region may be allocated to transmit the data and the control signals. However, even though only the control signals are transmitted, wireless resources may be allocated to the data region to transmit the control signals, when there are lots of control signals to be transmitted or when the control signals are not appropriate to be transmitted through the control channel.

The common control region is a region in which control information, such as a system parameter, a preamble, and location of a ranging region, transmitted to all user equipments is carried. The dedicated control region is a region in which control information transmitted to one specific user equipment or a plurality of specific user equipments is carried. For example, data region allocation information (or MAP information) as to resources necessary for transmitting and receiving data by each user equipment is the control information for the dedicated control region.

An ACK/NACK channel, a CQI channel, etc. may be transmitted through either the common control region or the dedicated control region or may be transmitted through both the common control region and the dedicated control region.

Figure 3:
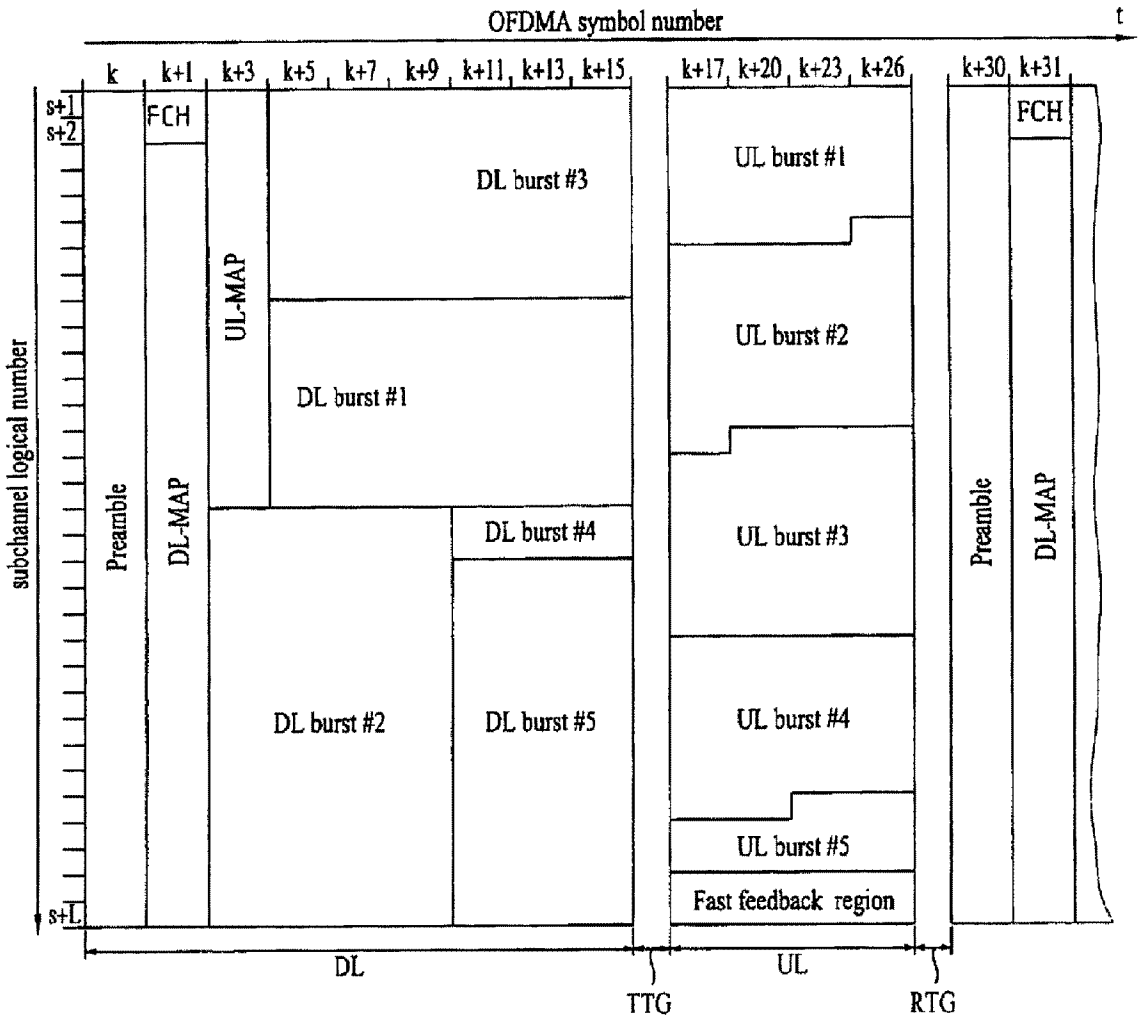
FIG. 3 illustrates another example of a frame structure.

FIG. 3 illustrates another example of a frame structure. A frame is a data sequence during a fixed time period used by a physical specification. For convenience of description, a frame structure used in a TDD system is shown by way of example but the present invention can be applied to a frame structure used in an FDD system. The frame may be an OFDMA frame.

The frame include a downlink frame and an uplink frame. TDD shares the same frequency in uplink and downlink transmission but uplink and downlink transmission occurs during different time intervals. The downlink frame temporally precedes the uplink frame. The downlink (DL) frame includes preamble, frame control header (FCH), downlink MAP (DL-MAP), uplink MAP (UL-MAP), and DL burst regions. The uplink (UL) frame includes UL burst regions.

A guard time for distinguishing between the uplink frame and the downlink frame is inserted into a middle part of the frame (i.e., between the downlink frame and the uplink frame) and into a last part of the frame (i.e., after the uplink frame). A transmit/receive transition gap (TTG) is a gap between a DL burst and a subsequent UL burst. A receive/transmit transition gap (RTG) is a gap between a UL burst and a subsequent DL burst.

A preamble is used for initial synchronization, cell search, frequency offset, and channel estimation, between a base station and a user equipment. An FCH includes information as to the length of a DL-MAP message and a coding scheme of a DL-MAP. The DL-MAP is a region in which the DL-MAP message is transmitted. The DL-MAP message defines access of a downlink channel. The DL-MAP message includes a configuration variation count of a downlink channel descriptor (DCD) and a base station identifier (ID). The DCD describes a downlink burst profile applied to a current MAP. The downlink burst profile indicates a characteristic of a downlink physical channel. The DCD is periodically transmitted by the base station through a DCD message.

A UL-MAP is a region in which a UL-MAP message is transmitted. The UL-MAP message defines access of an uplink channel. The UL-MAP message includes a configuration variation count of an uplink channel descriptor (UCD) and an effective start time of uplink allocation defined by the UL-MAP. The UCD describes an uplink burst profile. The uplink burst profile indicates a characteristic of an uplink physical channel. The UCD is periodically transmitted by the base station through the UCD message.

A part of the uplink frame includes a fast feedback region. The fast feedback region is assigned for fast uplink transmission compared with general uplink data and a CQI or an ACK/NACK signal may be carried thereon. The fast feedback region may be located at any region of a link frame and is not limited to the location or size illustrated in FIG. 3.

Figure 4A:
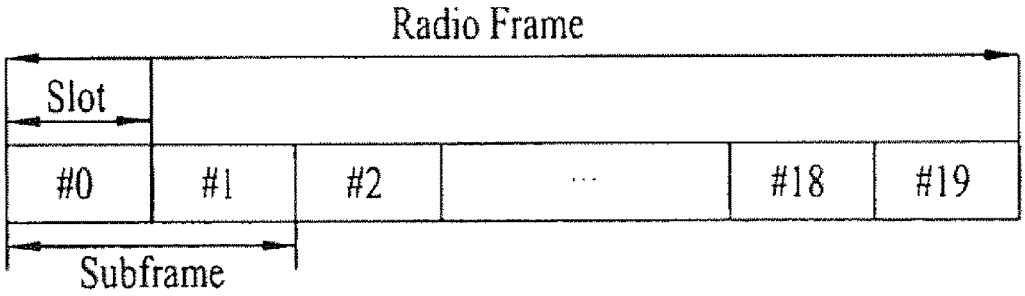
FIG. 4A illustrates an example of a superframe structure.

FIG. 4A illustrates an example of a superframe structure.

A superframe is comprised of 10 subframes each including 2 slots. One slot includes a plurality of OFDM symbols in a time region and at least one subcarrier in a frequency region. A slot is a unit for allocating wireless resources in a time region. For example, one slot may include 6 or 7 OFDM symbols.

The illustrated superframe structure is just one example and the number of subframes contained in the superframe, the number of slots contained in the subframe, and the number of OFDM symbols contained in the slot may be modified. The superframe may also be called a radio frame.

Figure 4B:
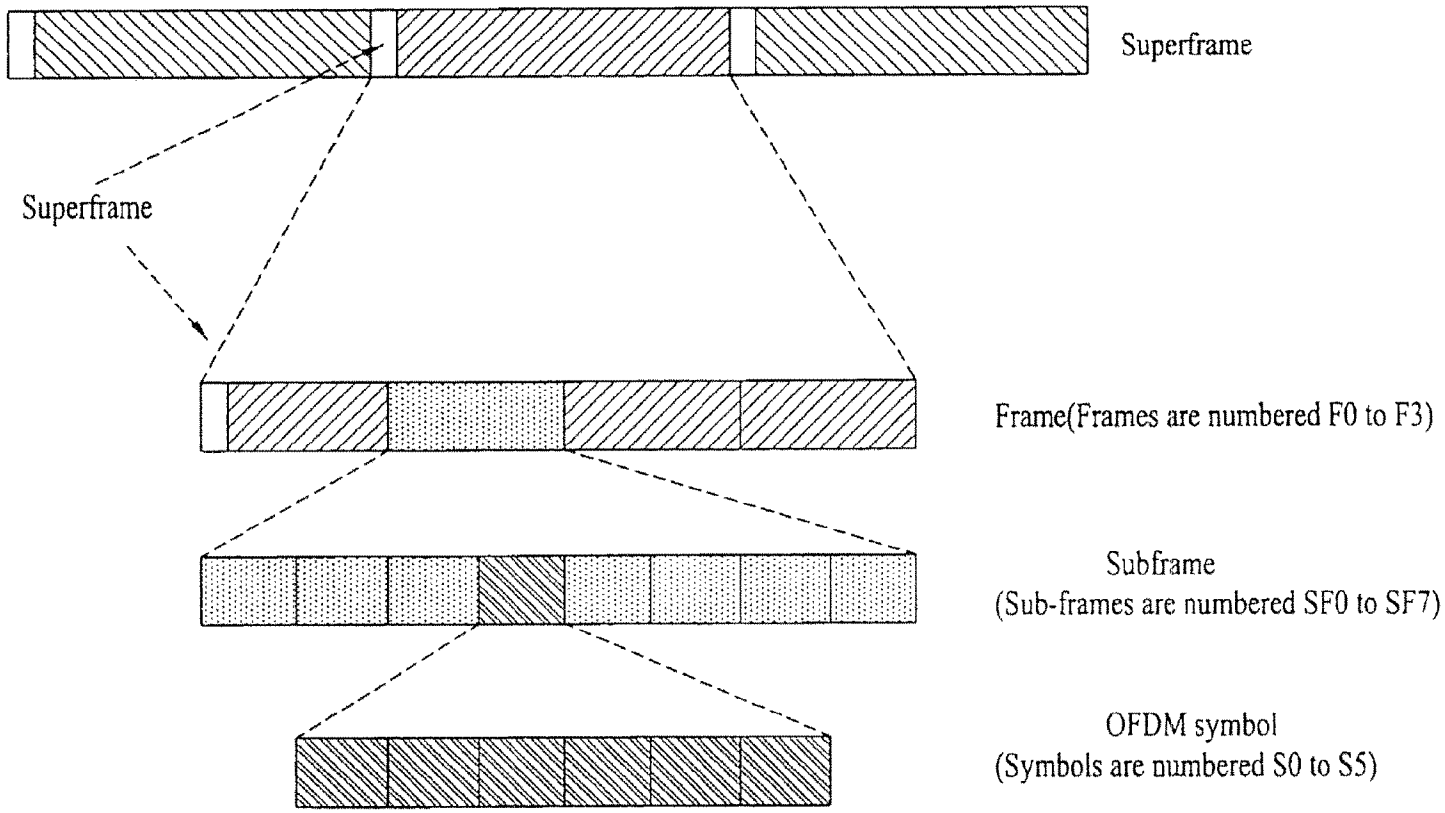
FIG. 4B illustrates a relationship between a superframe, frame, subframe, and OFDM symbols.

FIG. 4B illustrates a relationship between a superframe, frame, subframe, and OFDM symbols;

In FIG. 4B, one superframe has a length of 20 ms and is comprised of 4 frames each having a length of 5 ms. A superframe header is present at a start location of the superframe and includes superframe header system information and broadcast messages. The superframe header may have a structure comprised of several symbols or several subframes. One frame having a length of 5 ms is comprised of 8 subframes each having 6 OFDMA symbols.

Figure 5:
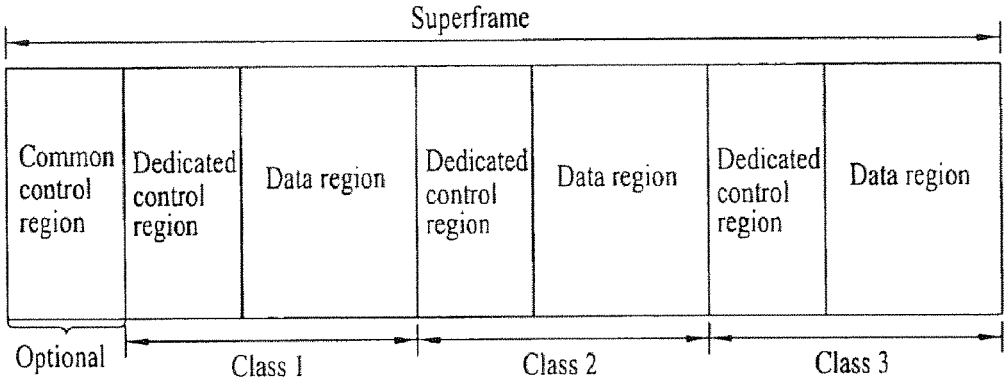
FIG. 5 illustrates a superframe structure according to an exemplary embodiment of the present invention.

FIG. 5 illustrates a superframe structure according to an exemplary embodiment of the present invention.

The superframe is divided into a common control region and a plurality of classes. The common control region is an optional region that is optionally included in the superframe. A common control signal for each user is transmitted through the common control region located at a start part of the superframe. If the common control region is not included in the superframe, the common control signal may be transmitted through a dedicated control region.

One class is comprised of a dedicated control region and a data region. The dedicated control region and the data region are arranged in an alternating pattern. Data region allocation information is control information guiding the data region to which resource allocation is indicated by the dedicated control region. The data region allocation information may be included in the common control region or the dedicated control region. In this case, resources may not be allocated to some data regions by the dedicated control region due to a loading state of a network or for other reasons.

If a data region indicated by the data region allocation information is determined, the dedicated control region includes resource allocation information as to resource allocation for each user in the data region guided by the data region allocation information.

The data region allocation information transmitted in the dedicated control region of a class 1 may be a control signal indicating the data region belonging to the class 1 and may be a control signal indicating the data region of a class 2 which is different from the class 1.

Although 3 classes contained in the superframe are illustrated, it is apparent that the number of classes may be more than or less than 3.

Figure 6:
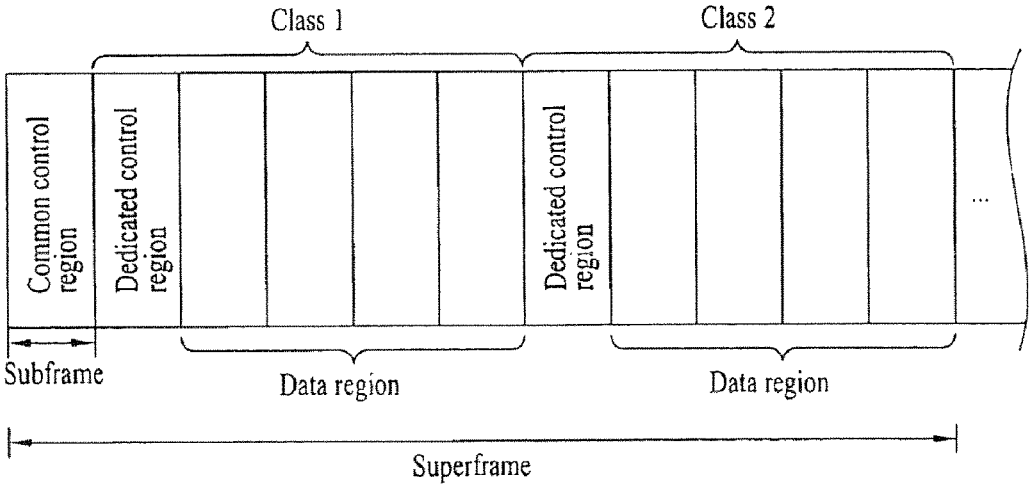
FIG. 6 illustrates a superframe structure according to another exemplary embodiment of the present invention.

FIG. 6 illustrates a superframe structure according to another exemplary embodiment of the present invention.

A common control region, a dedicated control region, and a data region contained in a superframe are divided into subframes. A transmission time interval (TTI) refers to a time necessary for transmitting one subframe.

Each region may include at least one subframe. In FIG. 6, the common control region and the dedicated control region contained in the superframe are respectively comprised of one subframe and the data region is comprised of 4 subframes. Therefore, the superframe has 11 subframes constituting the common control region, the dedicated control region, and the data region.

Figure 7:
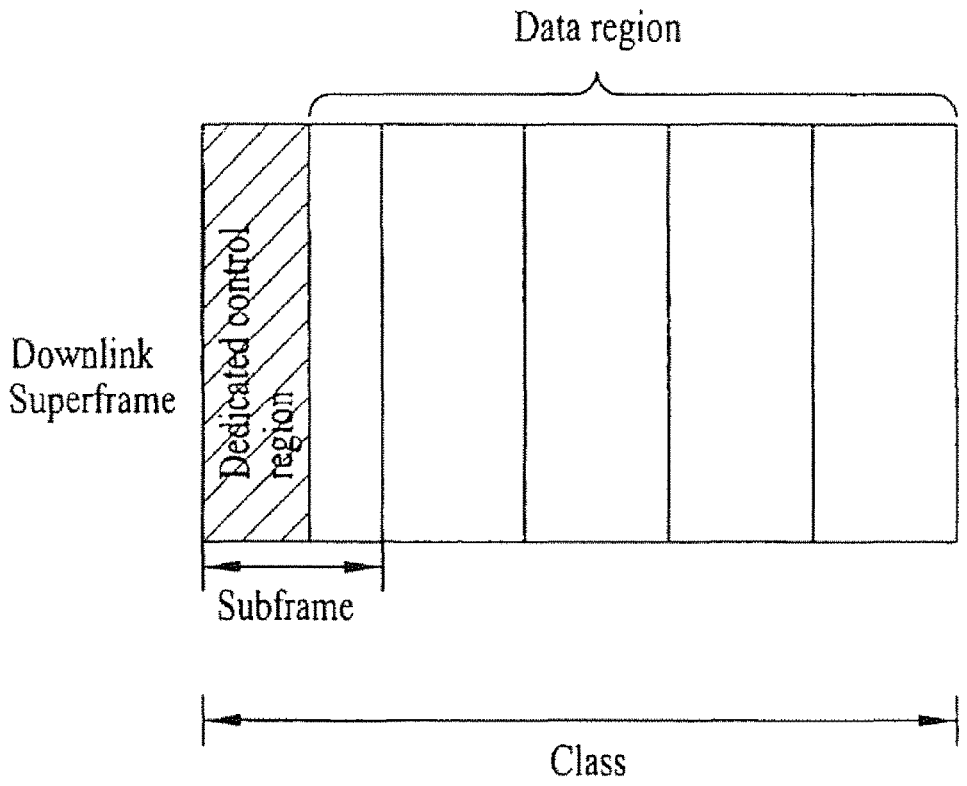
FIG. 7 illustrates a superframe structure according to still another exemplary embodiment of the present invention.

FIG. 7 illustrates a superframe structure according to still another exemplary embodiment of the present invention.

In FIG. 7, one class, which is a part of the superframe structure, is illustrated. Unlike the size of the dedicated control region of the superframe of FIG. 6, the size of a dedicated control region of the superframe of FIG. 7 may be less than one subframe. That is, the dedicated control region may occupy a region less than one subframe and may be varied or fixed within one subframe according to a system.

When the dedicated control region occupies a part of one subframe irrespective of whether the size of the dedicated control region is varied or fixed within one subframe, the other part of one subframe which is not contained in the dedicated control region within one subframe may be included in a data region. The size of the dedicated control region may be predefined to a given size or may be known through a common control region.

Figure 8:
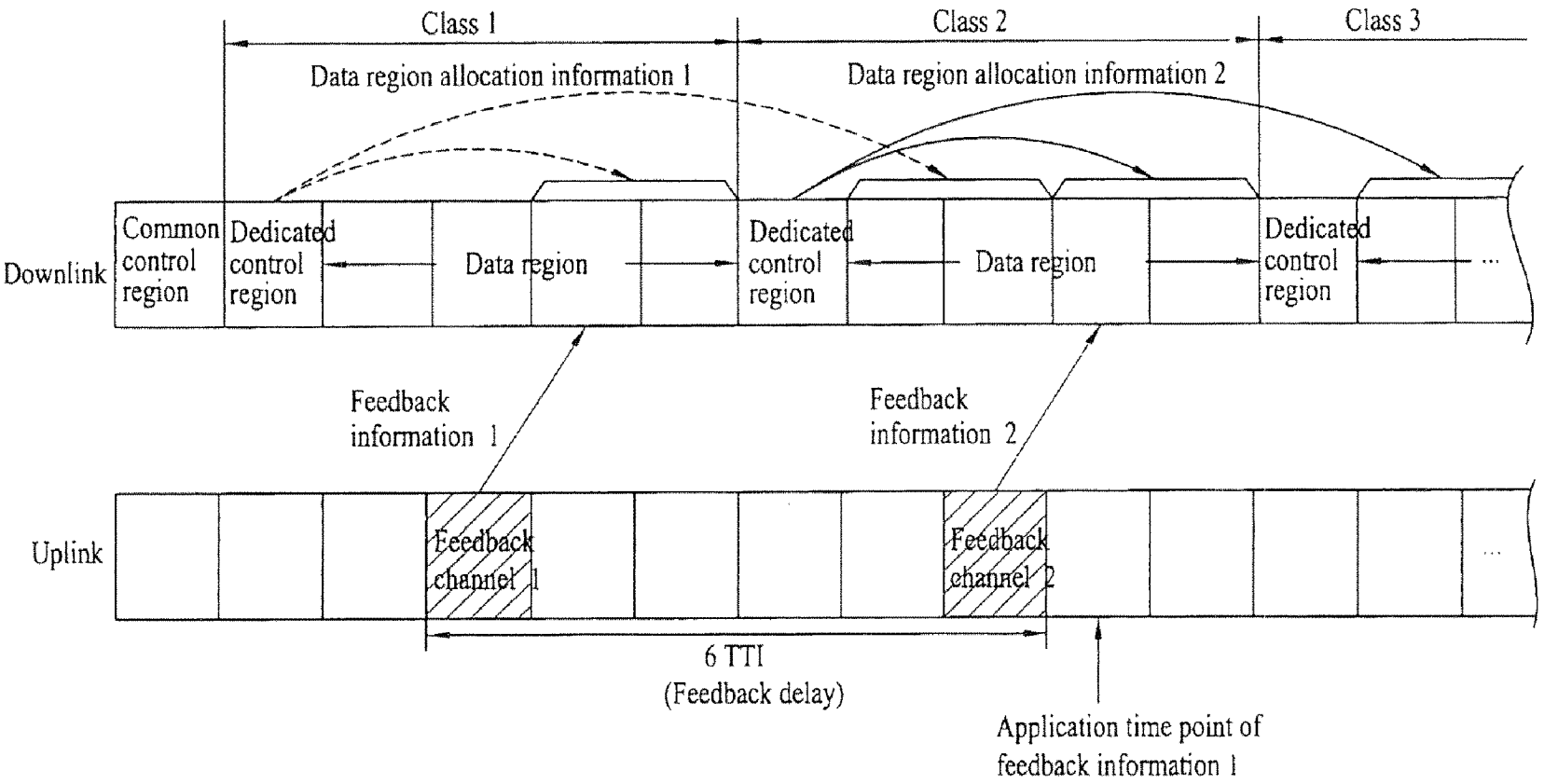
FIG. 8 illustrates a method of allocating a data region and a feedback channel according to an exemplary embodiment of the present invention.

FIG. 8 illustrates a method of allocating a data region and a feedback channel according to an exemplary embodiment of the present invention.

For convenience of description, a superframe structure used in an FDD system is shown. However, the present invention can be applied to a superframe structure used in a TDD system.

A downlink superframe is comprised of a common control signal and three classes. A data region of each of class 1 to class 4 is comprised of 4 subframes. The common control region is optionally included in the superframe. If the common control region is not included in the superframe, the superframe may consist of only the classes. An uplink superframe is not divided into a common control region and classes but divided into subframes.

Data region allocation information 1 and 2 guide data regions to which resource allocation is indicated by the respective dedicated control regions.

The data region guided by the data region allocation information 1 of the class 1 is two last subframes of the data region of the class 1 and two first subframes of the data region of the class 2. The data region indicated by the data region allocation information 2 of the class 2 is two last subframes of the data region of the class 2 and two first subframes of the data region of the class 3. That is, the dedicated control region may allocate resources to the data region of the class belonging thereto or may allocate resources to the data region of other classes. The data regions to which resource allocation is indicated by the dedicated control region may be continuous or discontinuous.

Furthermore, the data region to which resource allocation is indicated by the dedicated control region may be adjacent to the dedicated control region or separated from the dedicated control region by intervals of a few subframes. That is, the dedicated control region may precede, by a prescribed number of subframes, the data region to which the dedicated control region allocates resources. This provides a user equipment with a time for decoding the data region allocation information received from the dedicated control region in a downlink. Therefore, the user equipment, which does not have data to transmit or receive, can decode only the resource allocation information of the dedicated control region without a need of decoding the subframe of the data region.

If the user equipment, which does not have data to be received in a downlink or to be transmitted in an uplink, decodes only the data region allocation information, power loss caused by decoding of a subframe belonging to an unnecessary data region can be eliminated.

An uplink superframe periodically transmits downlink channel information for scheduling ("feedback information") through a feedback channel. Control signals such as a CQI and a PMI which should be periodically fed back are mainly transmitted through the feedback channel. The feedback channel in the uplink superframe is located ahead of the dedicated control region in the downlink superframe by a few subframes, which may be a prescribed value. Therefore, the feedback information is previously received and the feedback information is used for scheduling. A base station can directly transmit new resource allocation information including the feedback information in the dedicated control region.

Consequently, the user equipment can reduce a delay ("feedback delay") from a transmission time of the feedback information to a transmission/reception time of data by the new resource allocation information including the feedback information. In the system of FIG. 8, if the user equipment transmits feedback information 1 transmitted through a feedback channel 1 of the uplink superframe to the base station, the feedback information 1 is applied to the resource allocation information of a dedicated control region next to two subframes. A feedback delay up to a transmission time of data to the downlink by the resource allocation information is 6 TTIs.

Hereinafter, the number of subframes by which the feedback channel precedes the dedicated control region is referred to as a preceding position. In FIG. 8, since the feedback channel 1 precedes the dedicated control region of the class 2 by two subframes, the preceding position of the feedback channel 1 is 2. The base station may transmit information as to the preceding position through the common control region.

Control signals such as a CQI and a PMI which should be periodically fed back are mainly transmitted through the feedback channel. The feedback channel is located ahead of the dedicated control region by a few subframes so that the base station can perform scheduling before the dedicated control region is transmitted. The base station may previously determine the preceding position and transmit feedback information. Alternatively, the base station may update the preceding position at periods of every superframe or a few superframes and inform the user equipment of the preceding position.

Although 4 subframes are shown in the data region, the present invention is not limited thereto.

Figure 9:
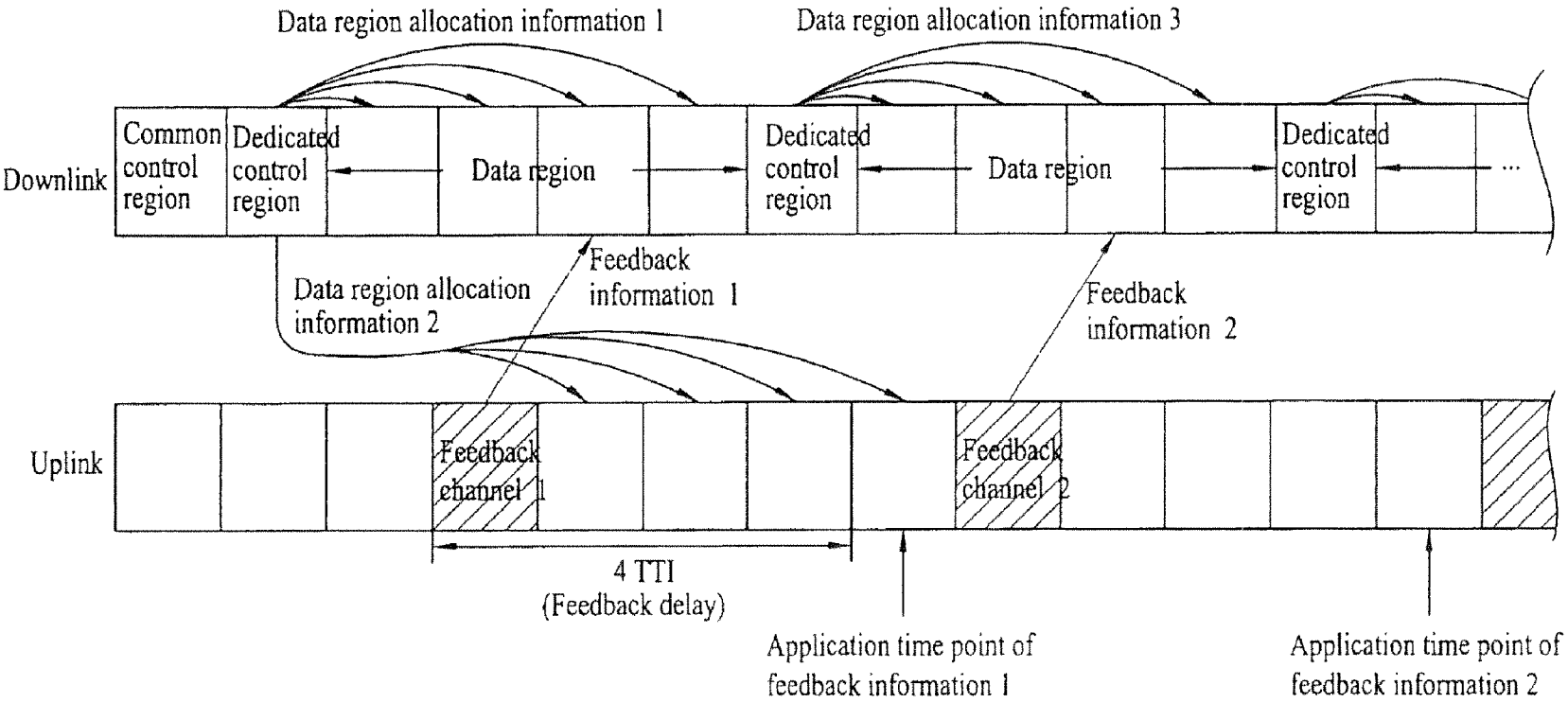
FIG. 9 illustrates a method of allocating a data region and a feedback channel according to another exemplary embodiment of the present invention.

FIG. 9 illustrates a method of allocating a data region and a feedback channel according to another exemplary embodiment of the present invention.

For convenience of description, a superframe structure used in an FDD system is shown. However, the present invention can be applied to a superframe structure used in a TDD system.

Data region allocation information 1 and 3 of a downlink designate data regions adjacent to the dedicated control region. Data region allocation information 2 of an uplink designates a data region corresponding to 4 subframes after two subframes from the dedicated control region.

In the system of FIG. 9, if a user equipment transmits feedback information 1 through a feedback channel 1 of an uplink superframe to a base station, the feedback information 1 is applied to resource allocation information of the dedicated control region after two subframes. A feedback delay up to a transmission time of data to the downlink by the resource allocation information is 4 TTIs.

Figure 10:
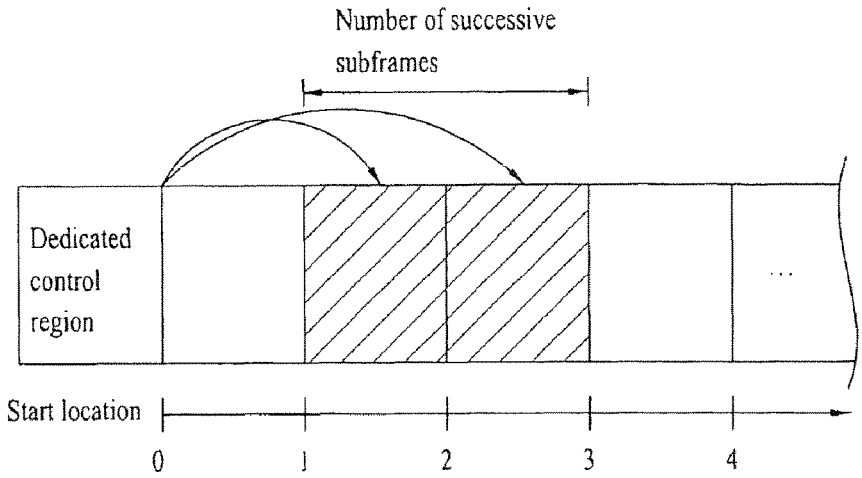
FIG. 10 illustrates an example of data region allocation information in the superframe structure shown in FIG. 6.

FIG. 10 illustrates an example of data region allocation information in the superframe structure shown in FIG. 6.

A dedicated control region occupies one subframe as in FIG. 6.

Data region allocation information is a control signal transmitted in a common control region or a dedicated control region and may include a location and length of a data region as a method of indicating the data region.

The data region allocation information may indicate a data region including information ("start location") as to a location of a subframe at which the data region to which resources are allocated by the dedicated control region is started and the number of successive subframes from the start location. The start location may indicate a relative distance between subframes corresponding to the data area indicated by the control signal from the subframe of the dedicated control region. The start location may be 0 or more. Further, start locations used by each user may be irregular. The number of successive subframes may be 1, 2 or more. Information as to the start location or the number of successive subframes may be transmitted through the common control region (for example, BCH). Thus, the number of successive subframes may be changed according to the information transmitted through the common control channel or the dedicated control channel.

In FIG. 10, the start location of the data region indicated by the data region allocation information is 1 and the number of successive subframes is 2. Namely, the data region indicated by the data region allocation information is started at a location separated from the dedicated control region by one subframe and two subframes succeeding the start location serve as a data region to which the dedicated control region allocates resources.

Figure 11:
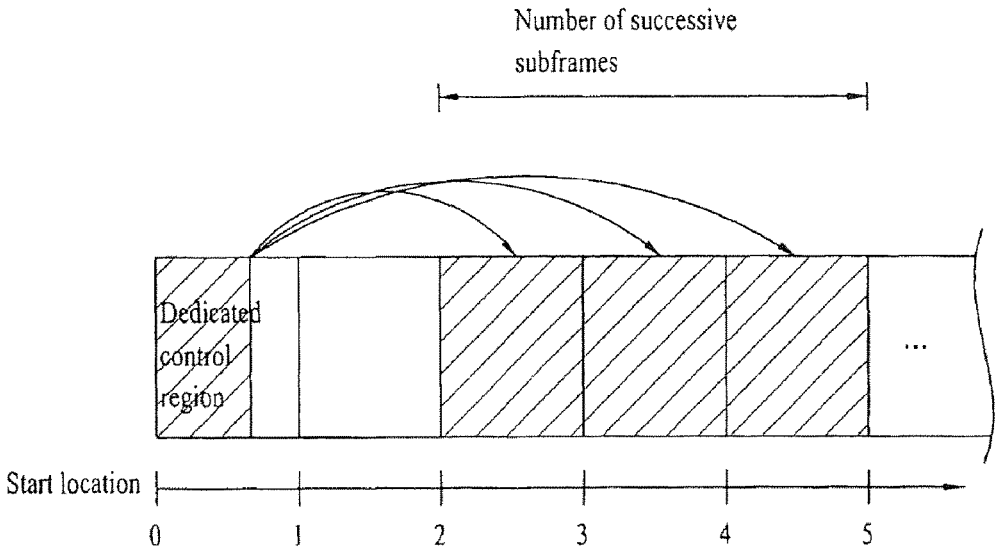
FIG. 11 illustrates an example of data region allocation information in the superframe structure shown in FIG. 7.

FIG. 11 illustrates an example of data region allocation information in the superframe structure shown in FIG. 7.

A dedicated control region occupies a part of a subframe as in FIG. 7. Therefore, a subframe which is a start point of a data region includes the dedicated control region. Whether the dedicated control region occupies a part of one subframe may be indicated by a common control region. Accordingly, if the dedicated control region is a part of one subframe, the start point of the start location of the data region is 0. In FIG. 11, the start location of the data region indicated by the data region allocation information is 2 and the number of successive subframes from the start location is 3.

Figure 12:
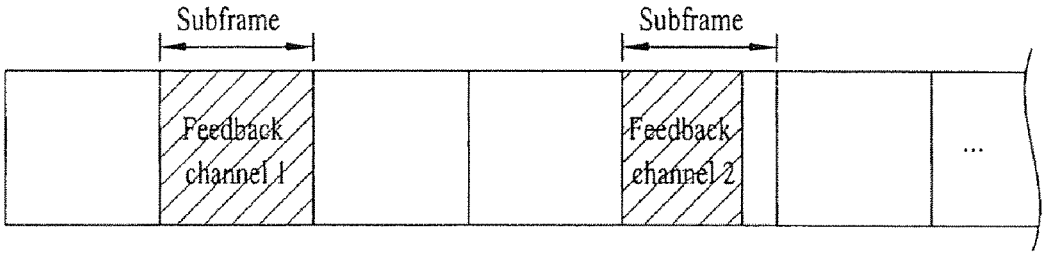
FIG. 12 illustrates a feedback channel in an uplink according to the present invention.

FIG. 12 illustrates a feedback channel in an uplink according to the present invention.

An uplink superframe is comprised of a plurality of subframes. A feedback channel 1 occupies one subframe. A feedback channel 2 occupies a part of one subframe. The feedback channel may be fixed to occupy one subframe. The size of the feedback channel may be fixed or varied within one subframe as a part of one subframe.

Figure 13:
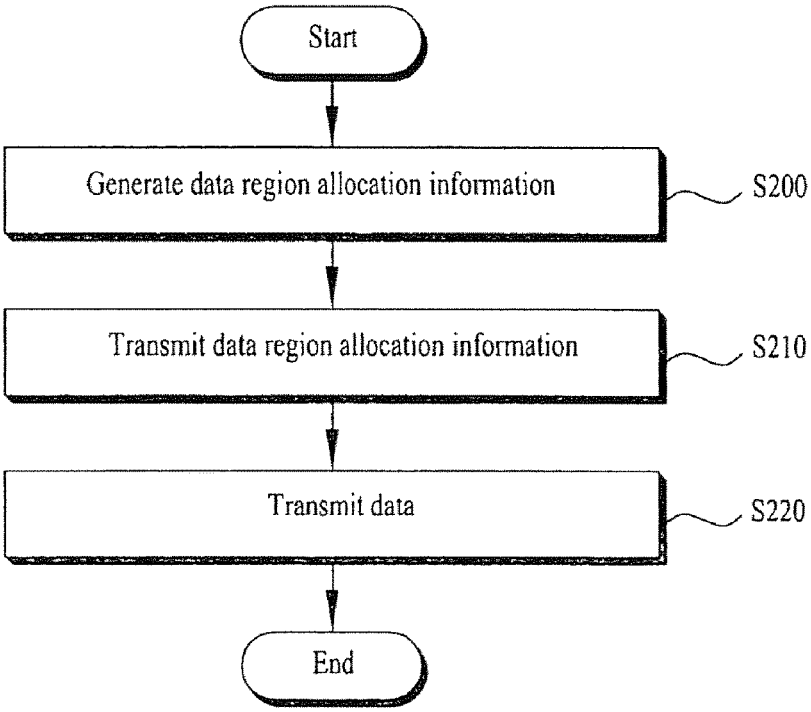
FIG. 13 is a flow chart illustrating a data transmission process according to an exemplary embodiment of the present invention.

FIG. 13 is a flow chart illustrating a data transmission process according to an exemplary embodiment of the present invention.

Data region allocation information is information as to the location and size of a data region to which a specific dedicated control region allocates resources in a downlink (or uplink) superframe. Before transmitting data, a base station generates the data region allocation information (step S200) to ensure a data region to which data is to be transmitted.

The base station transmits the data region allocation information to a user equipment (step S210). The user equipment can know that which subframe interval of the data region receives data in the downlink superframe through data region allocation information. The data region allocation information may be transmitted in a common control region, or in a dedicated control region when the common control region is not present.

The base station transmits data using allocated resources by scheduling throughout the data region (step S220).

Figure 14:
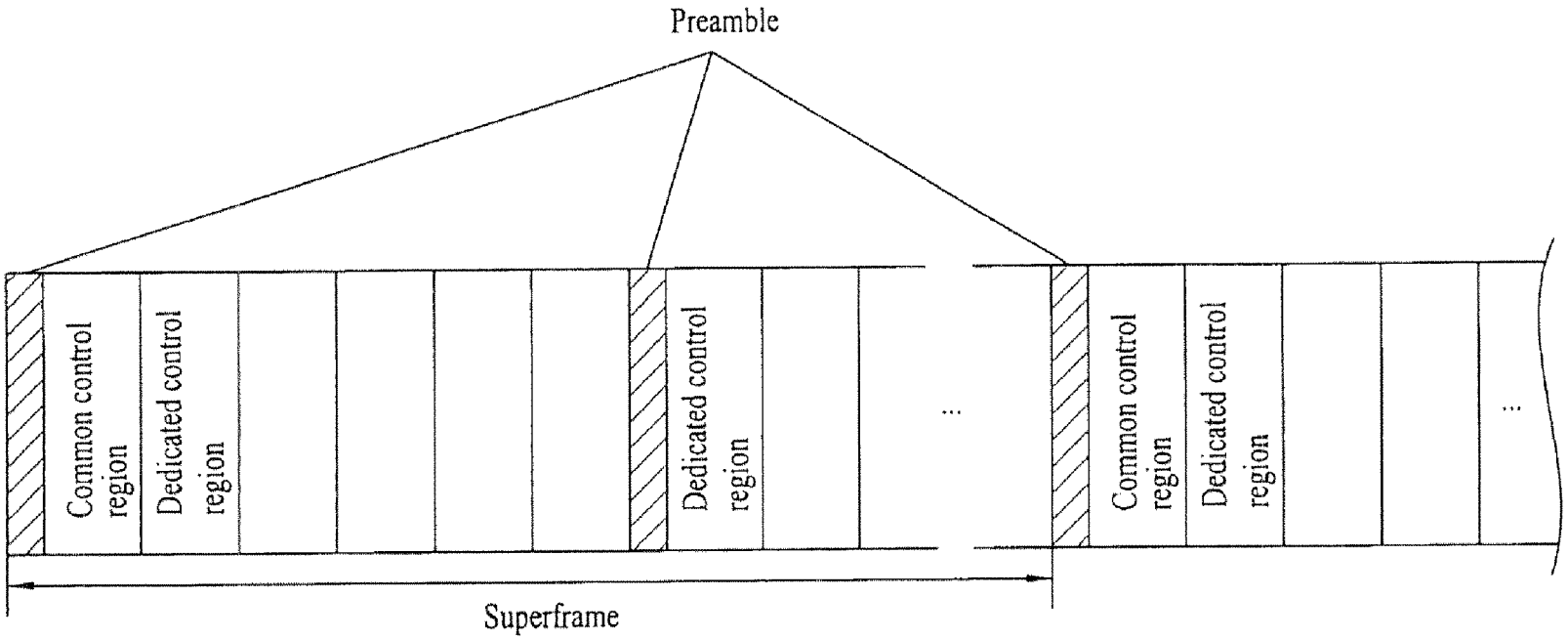
FIG. 14 illustrates a method of transmitting a preamble in a superframe according to the present invention.

FIG. 14 illustrates a method of transmitting a preamble in a superframe according to the present invention.

Every superframe includes a common control region and the common control region includes a preamble. In a general superframe structure, a common control channel is transmitted through a superframe preamble, and the preamble is included for time synchronization in the superframe preamble.

The superframe preamble requires a long transmission period to reduce overhead. However, the preamble may be transmitted through a data region or a dedicated control region as well as the superframe preamble to reduce handover latency.

Figure 15A:
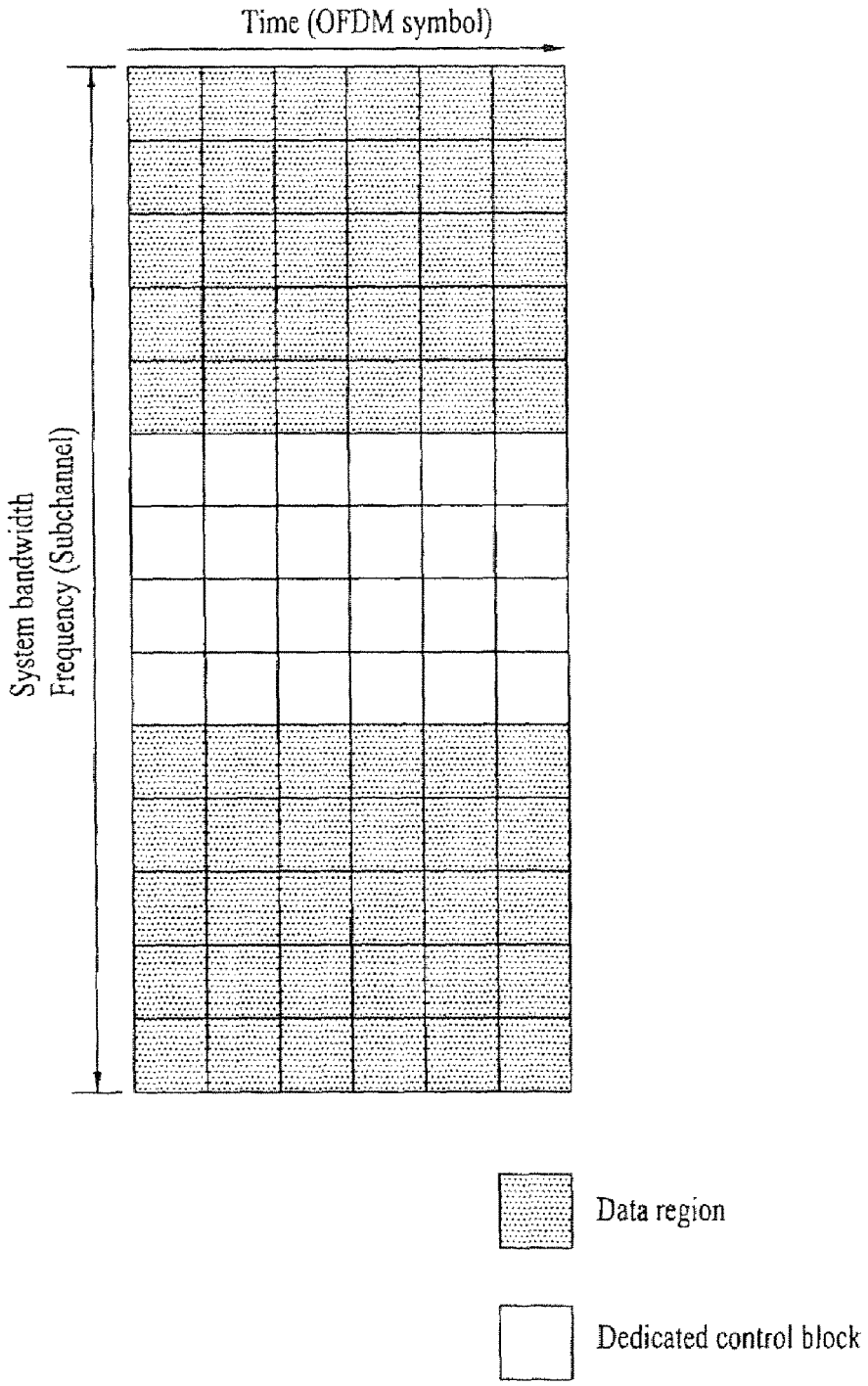
FIGS. 15A and 15B illustrate configuration examples of a dedicated control region according to the present invention.
Figure 15B:
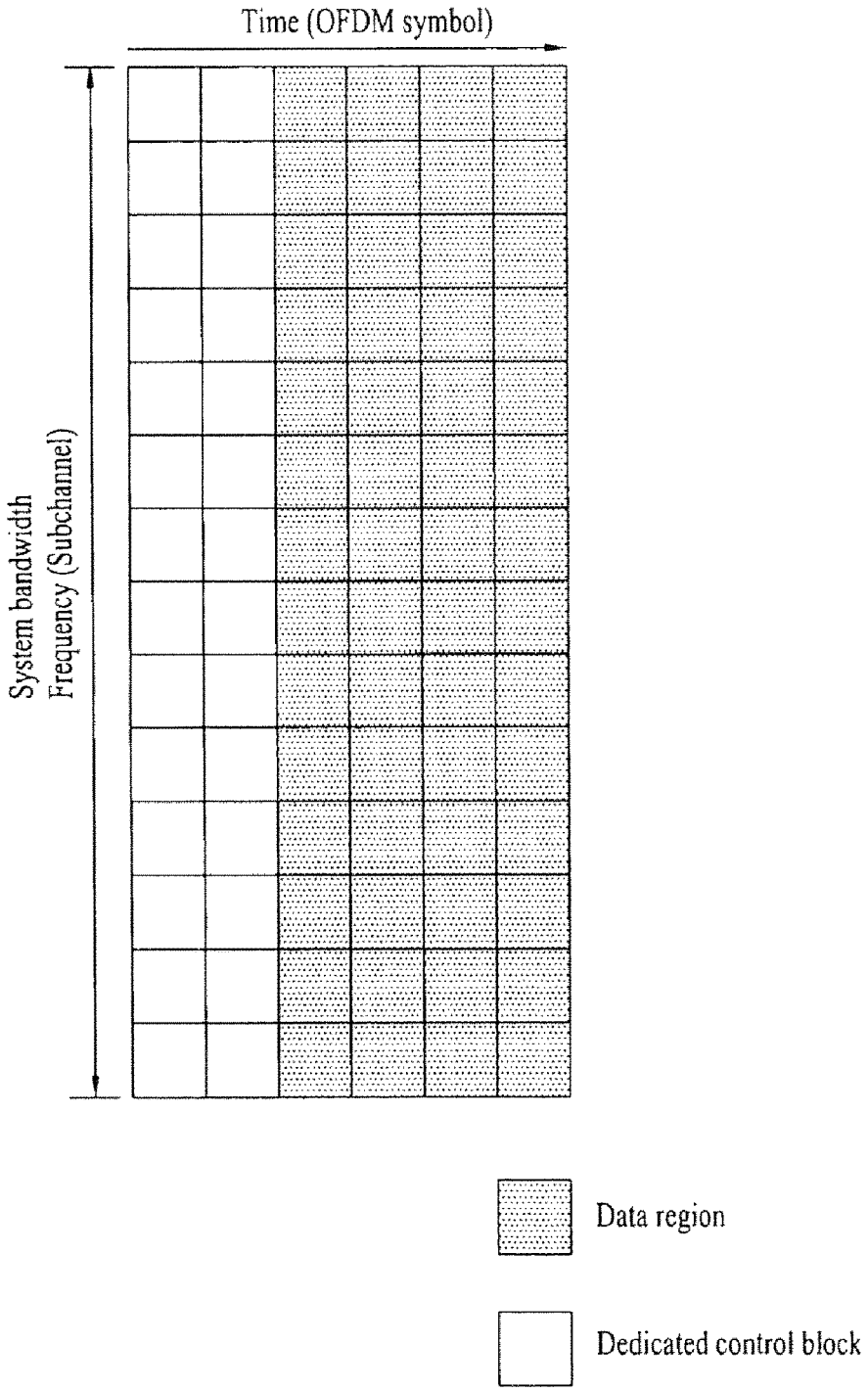

FIGS. 15A and 15B illustrate configuration examples of a dedicated control region according to the present invention.

FIG. 15A illustrates a configuration example of a dedicated control region using FDM. The dedicated control region may be allocated by subchannels of a specific frequency band. FIG. 15B illustrates a configuration example of the dedicated control region using TDM. The dedicated control region may be allocated by specific symbols in time axis. As another example of the present invention, a part of the dedicated control region may be constructed by FDM and the other part thereof may be constructed by TDM.

A remaining data region of subframes contained in a dedicated control channel may be indicated by a previous dedicated control region as shown in FIG. 8. Alternatively, the remaining data area may be indicated through the dedicated control channel of a corresponding subframe as shown in FIG. 9.

Figure 16A:
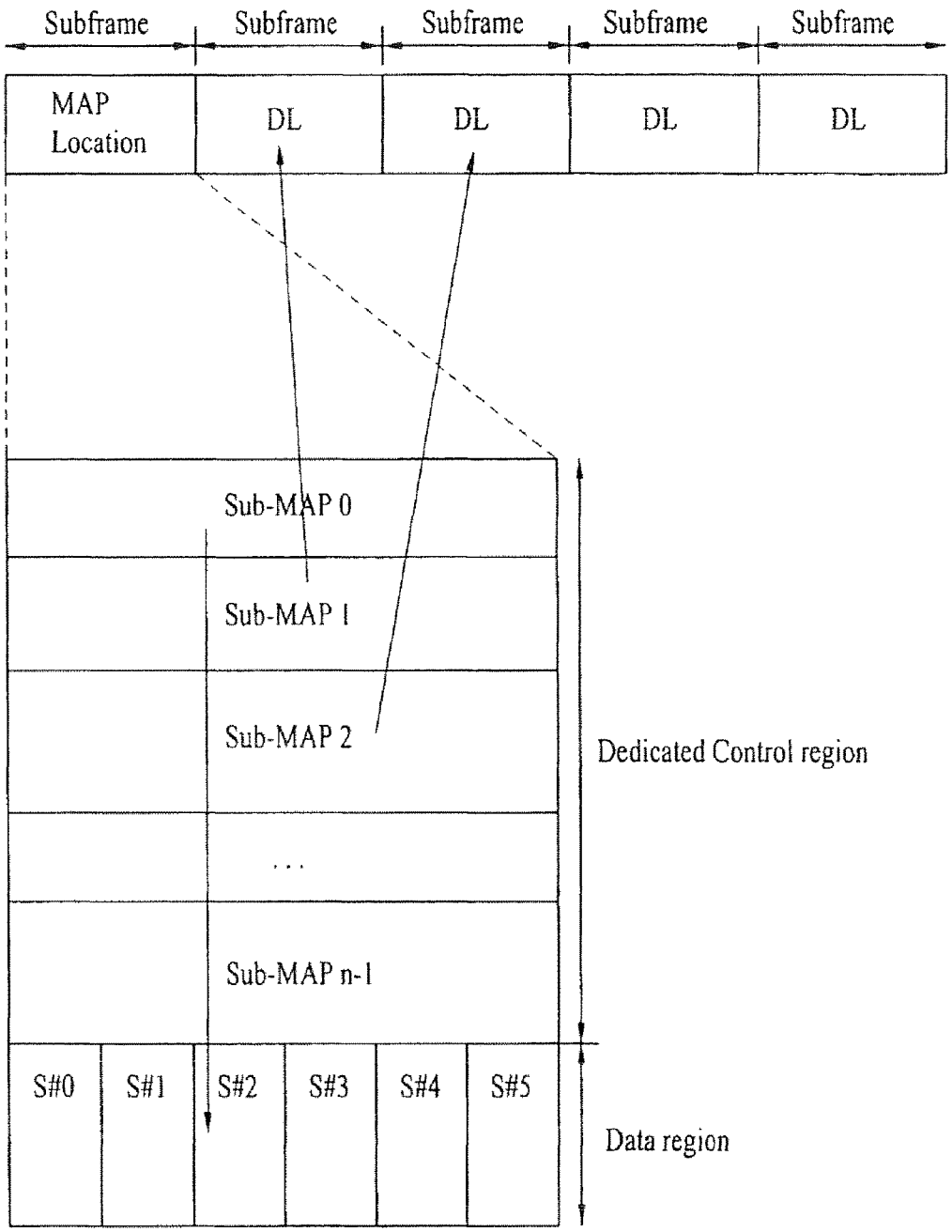
FIGS. 16A and 16B illustrate examples using a remaining region in a superframe header region as a dedicated control region according to the present invention.
Figure 16B:
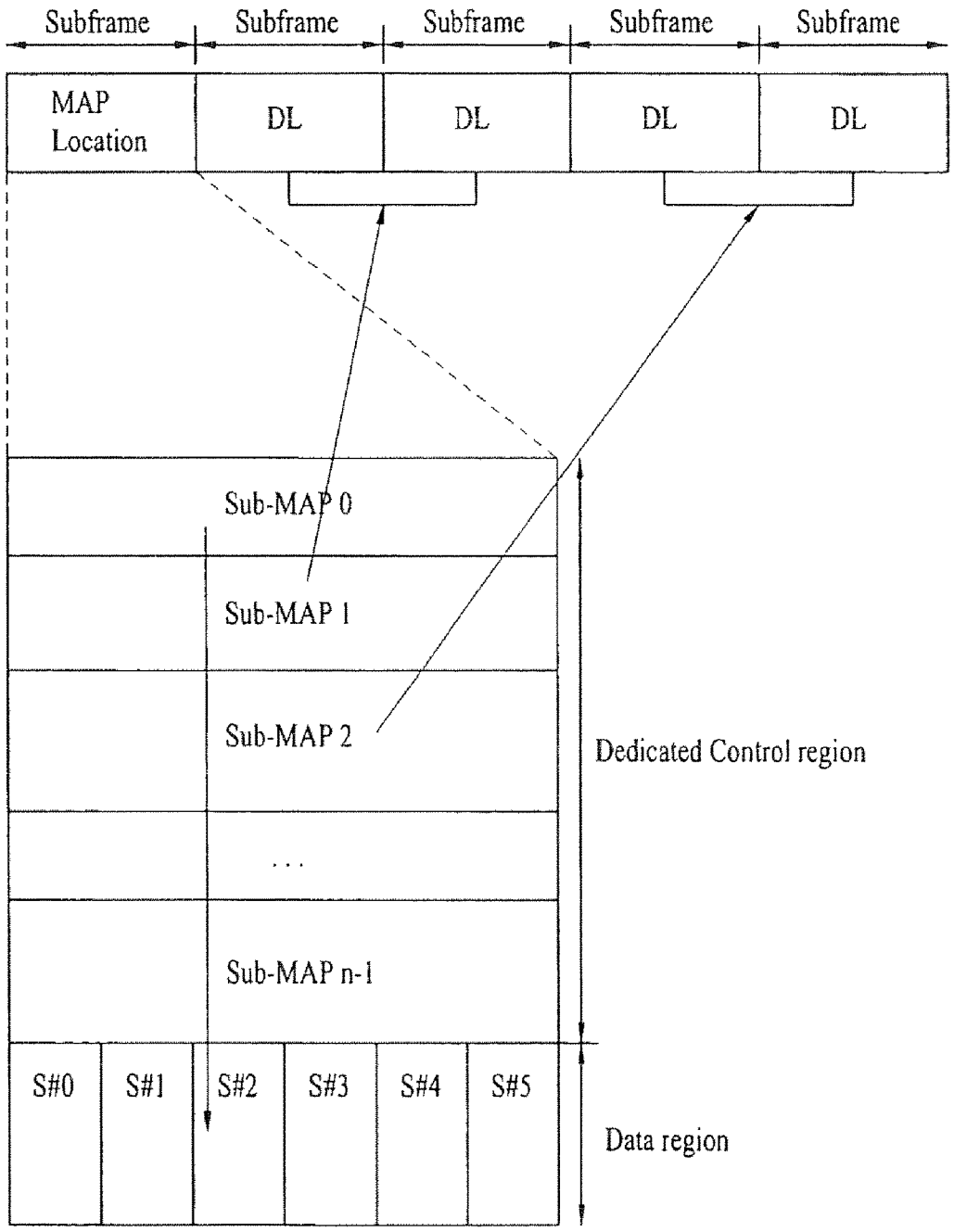

FIGS. 16A and 16B illustrate examples using a remaining region as a dedicated control region according to the present invention.

FIGS. 16A and 16B are exemplary forms and may be applied independently or together with the arrangement of the following dedicated control region. A sub MAP Sub-MAP 0 may be used as a dedicated control region indicating data regions S#0 to S#5. Sub MAPs Sub-MAP 1 to Sub-MAP n−1 may be used as a dedicated control region indicating a data region of a downlink subframe.

Figure 17A:
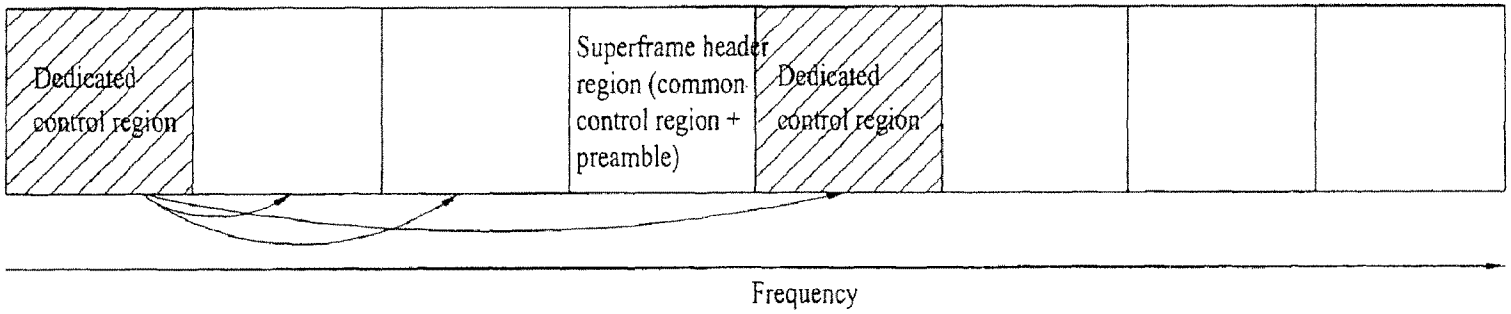
FIGS. 17A and 17B illustrate arrangement examples of a dedicated control region in a frame of an FDD system according to the present invention.
Figure 17B:
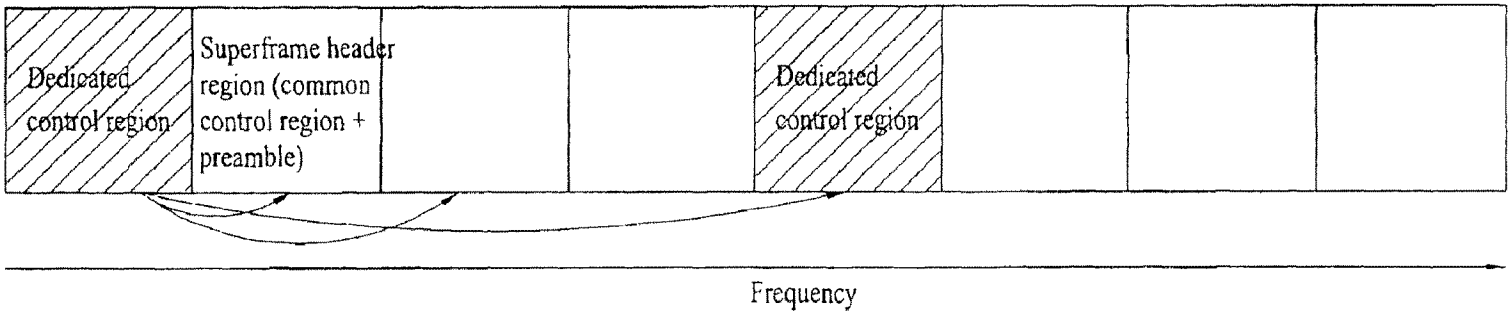
Figure 18A:
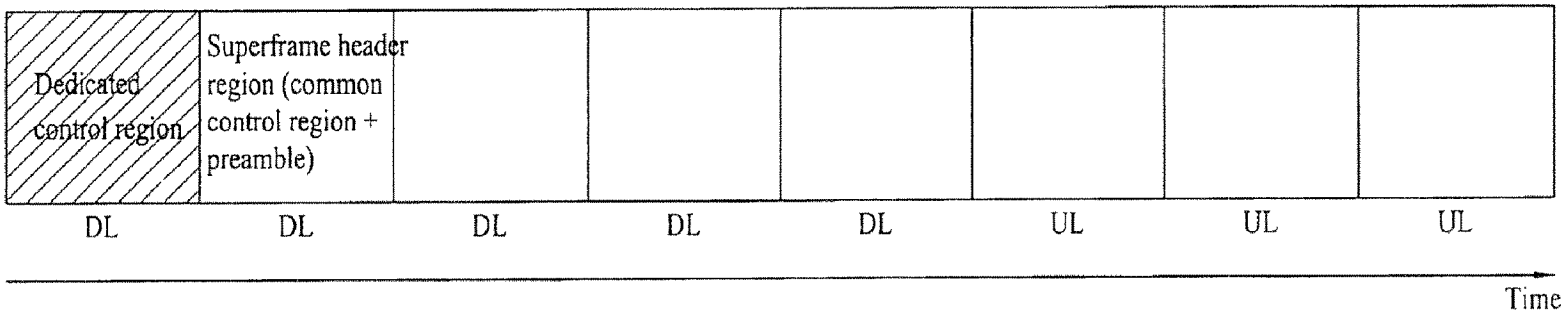
FIGS. 18A to 18D illustrate dedicated control regions preceding a superframe header region in a frame of a TDD system according to the present invention.
Figure 18B:
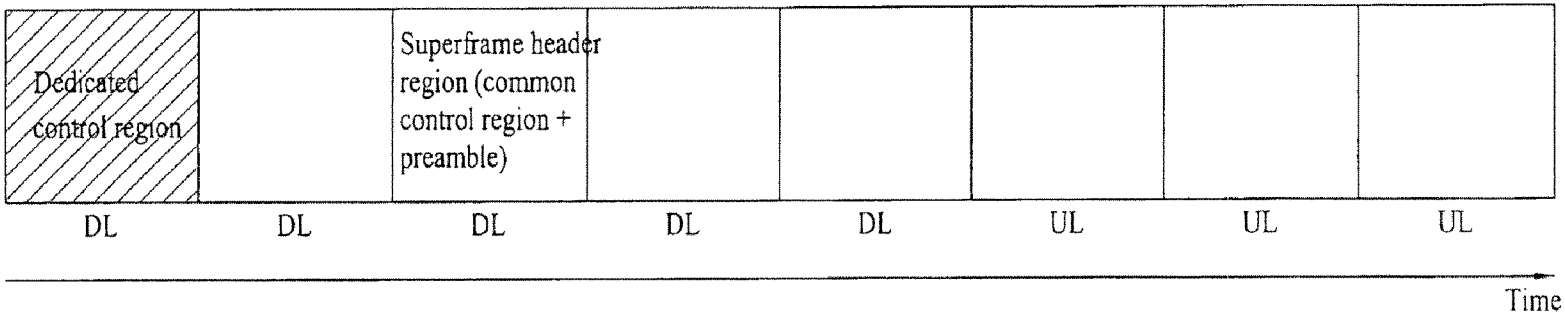
Figure 18C:
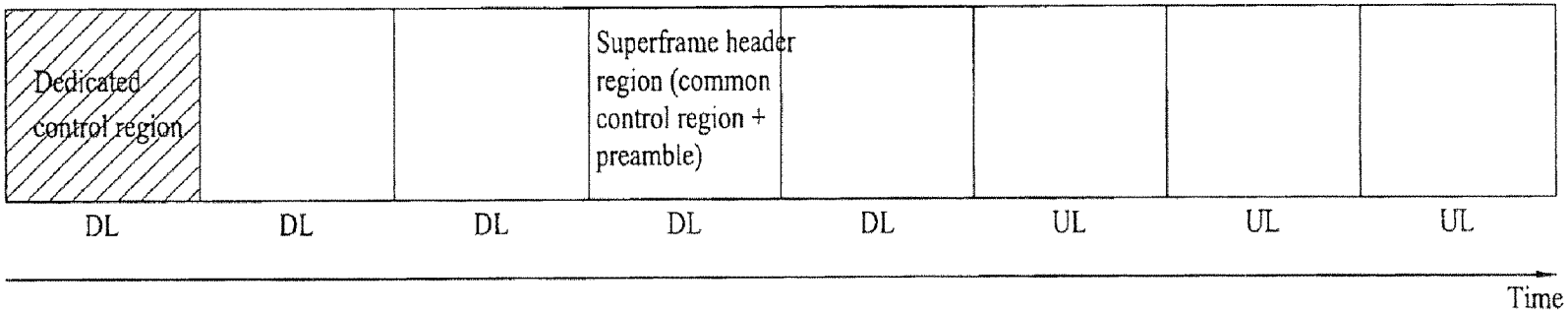
Figure 18D:
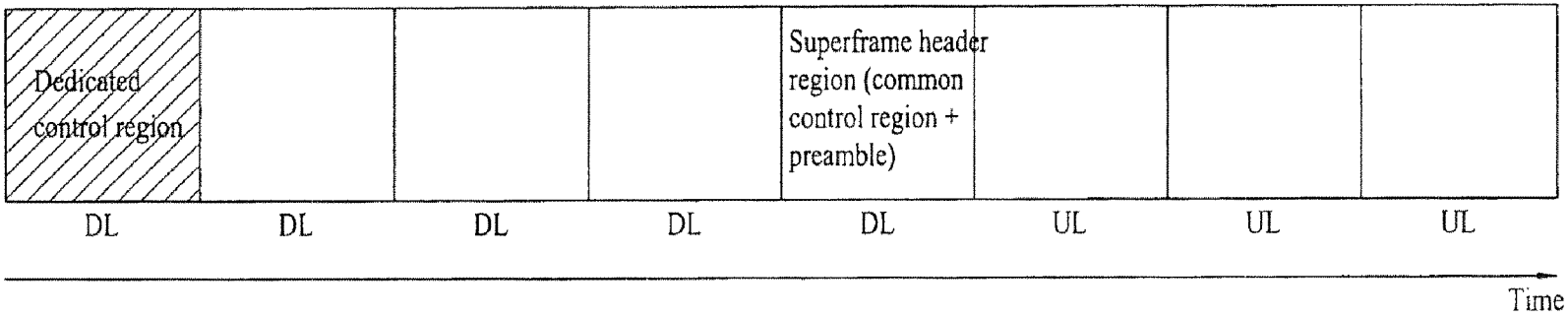

FIGS. 17A and 17B illustrate arrangement examples of a dedicated control region in a frame of an FDD system according to the present invention.

In FIG. 17A, the second dedicated control region is located just after a superframe header region. In FIG. 17B, the first dedicated control region is located just before the superframe header region.

If the dedicated control region precedes the superframe header region in one FDD frame, the dedicated control region may indicate the remaining region of the superframe region or the remaining region of the next dedicated control region. Moreover, the prior dedicated control region may include information for allocating available resources to the data region in subframes up to the superframe header region.

FIGS. 18A to 18D illustrate dedicated control regions preceding a superframe header region in a frame of a TDD system according to the present invention.

If a superframe header region and a dedicated control region are located in the same subframe, resources for transmitting a dedicated control channel may be insufficient. Therefore, the dedicated control region may be located such that the dedicated control region is not overlapped with the superframe header region, that is, a subframe in which a common control region and a preamble are present. If the dedicated control region precedes the superframe header as illustrated in FIGS. 18A to 18D, the dedicated control region may include information allocating available resources between the dedicated control region and the superframe header to the data region.

FIGS. 19A to 19F illustrate dedicated control regions each preceding a superframe header region in a frame of a TDD system in relation to a legacy region according to the present invention.

If a dedicated control region is located just before a superframe header region, a reference symbol "A" designates a legacy region. For example, the legacy region may be a region for user equipments of the IEEE 802.16e system which is a legacy system in the IEEE 802.16m system. The legacy region includes a preamble for legacy user equipments, that is, a legacy preamble. Unlike FIGS. 18A to 18D, FIGS. 19A to 19F can guarantee compatibility with the legacy user equipments.

Figure 19A:
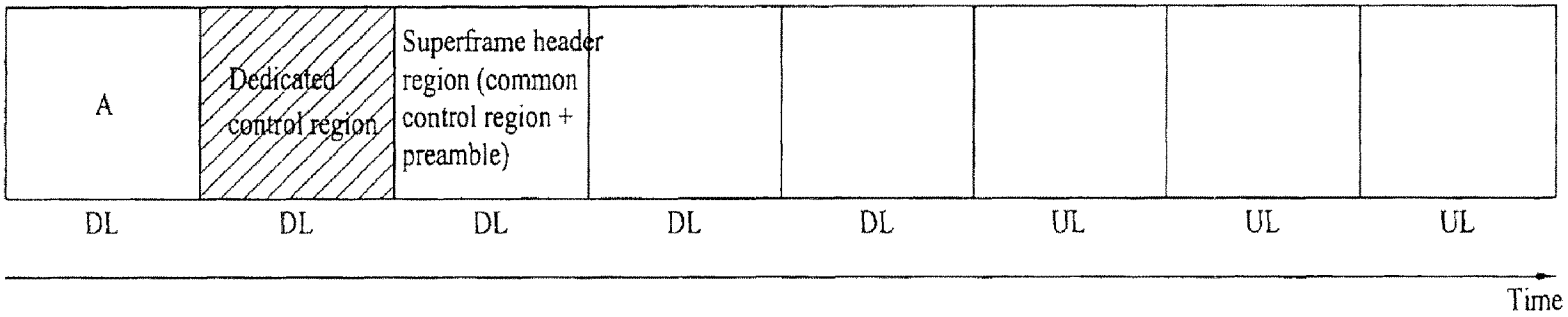
FIGS. 19A to 19F illustrate dedicated control regions each preceding a superframe header region in a frame of a TDD system in relation to a legacy region according to the present invention.
Figure 19B:
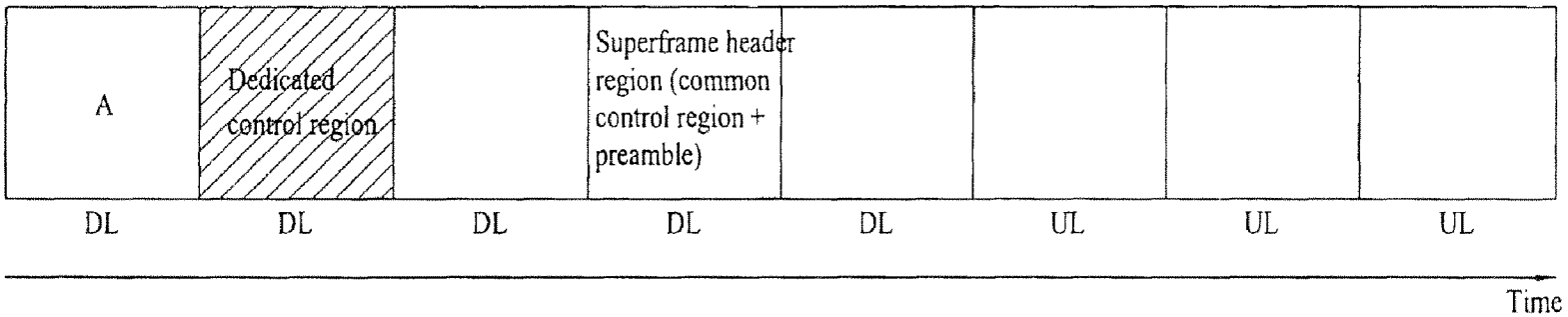
Figure 19C:
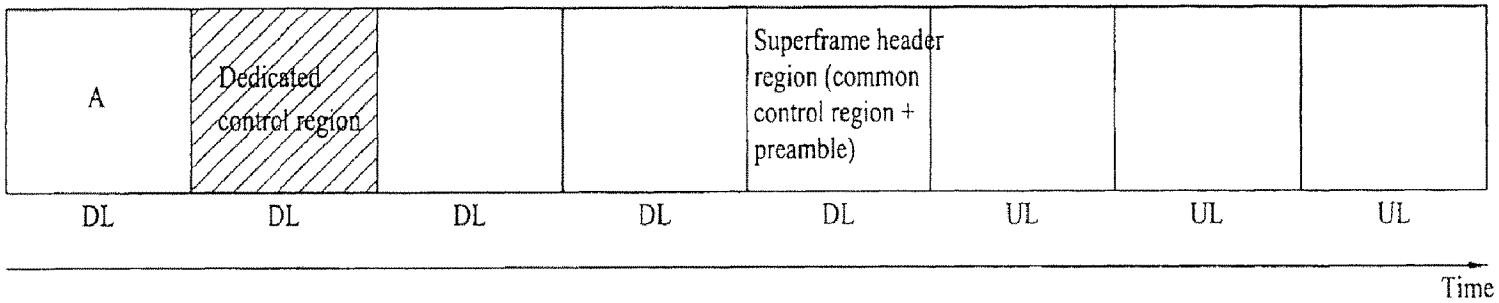
Figure 19D:
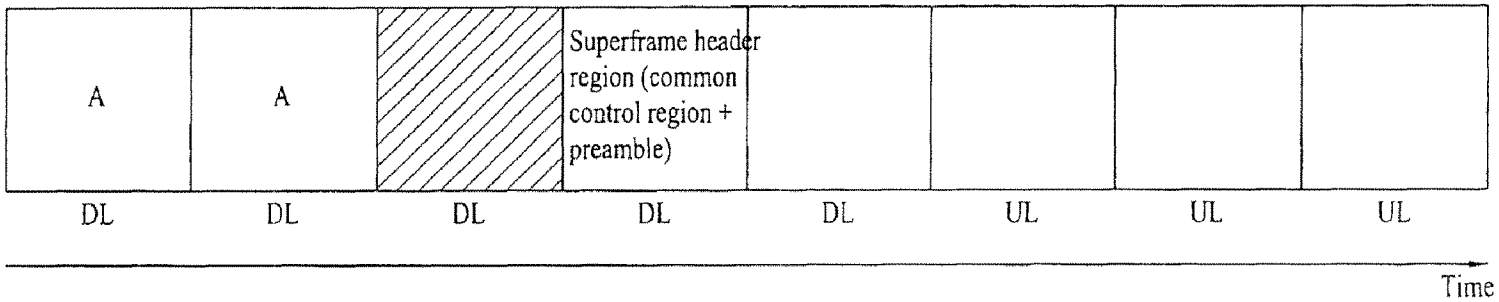
Figure 19E:
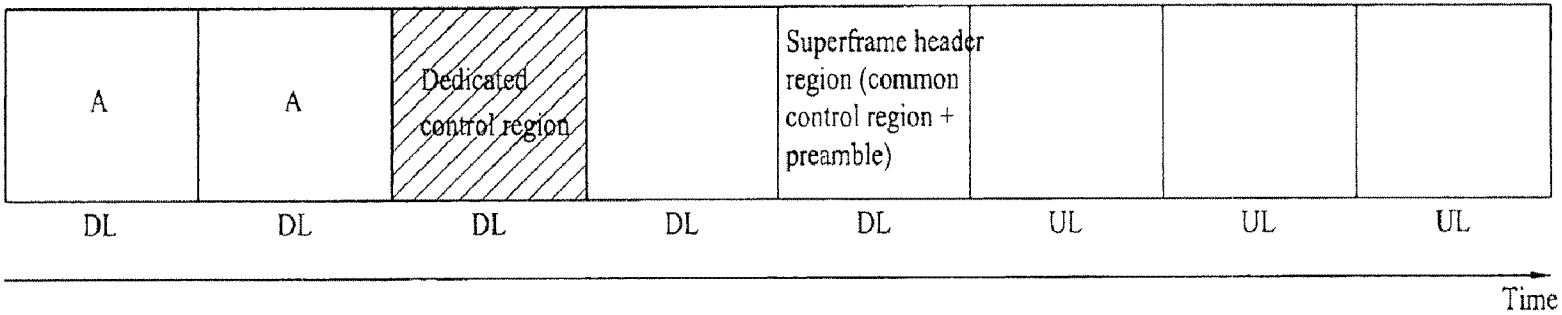
Figure 19F:
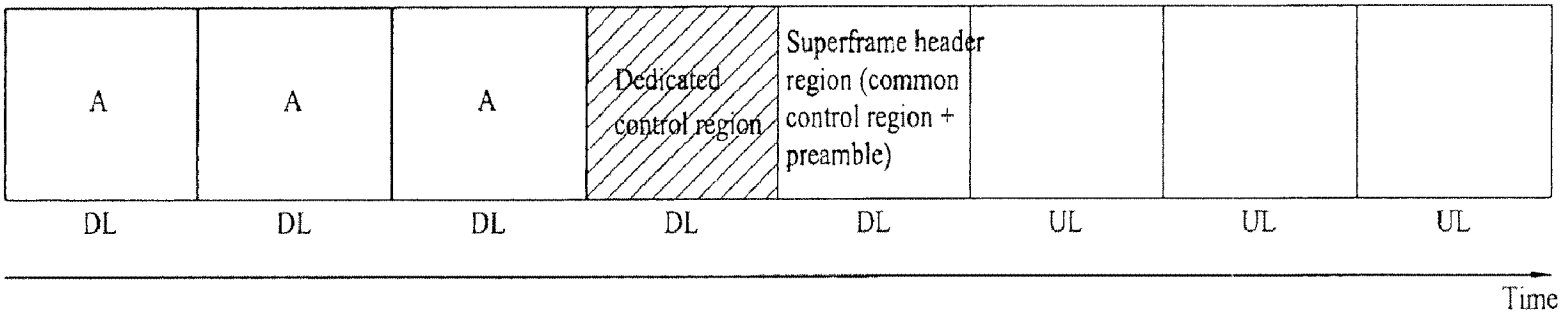
Figure 20A:
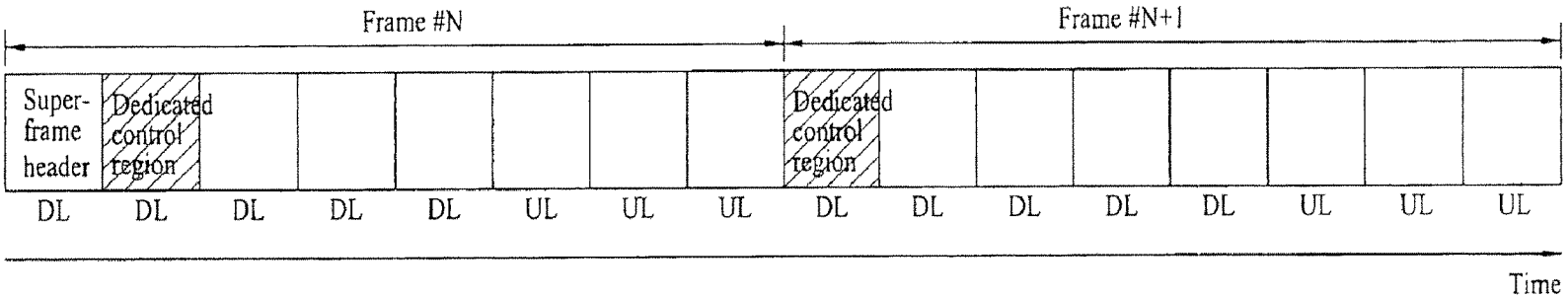
FIGS. 20A to 20H illustrate arrangements of a dedicated control region in a superframe of a TDD system according to the present invention.
Figure 20B:
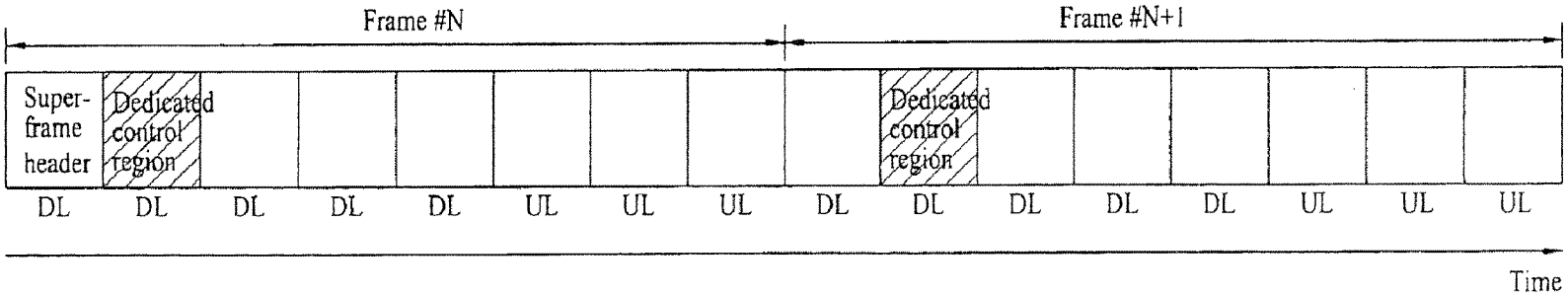
Figure 20C:
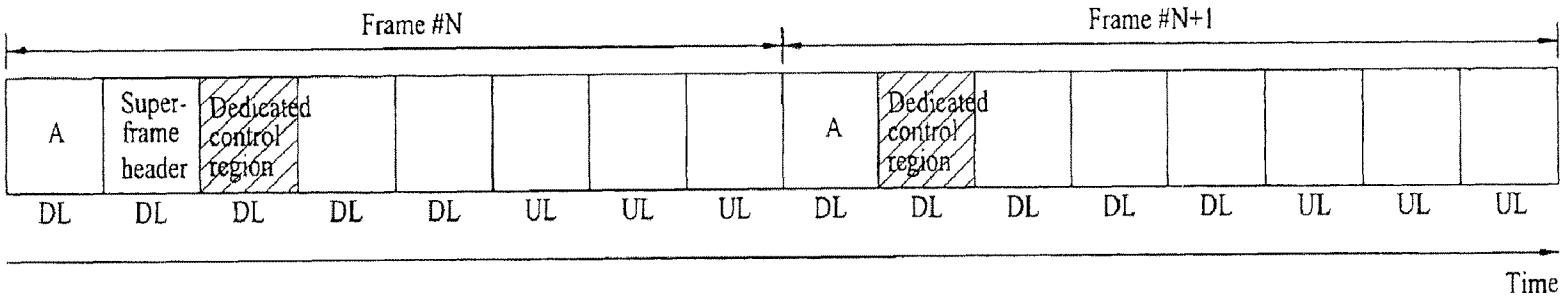
Figure 20D:
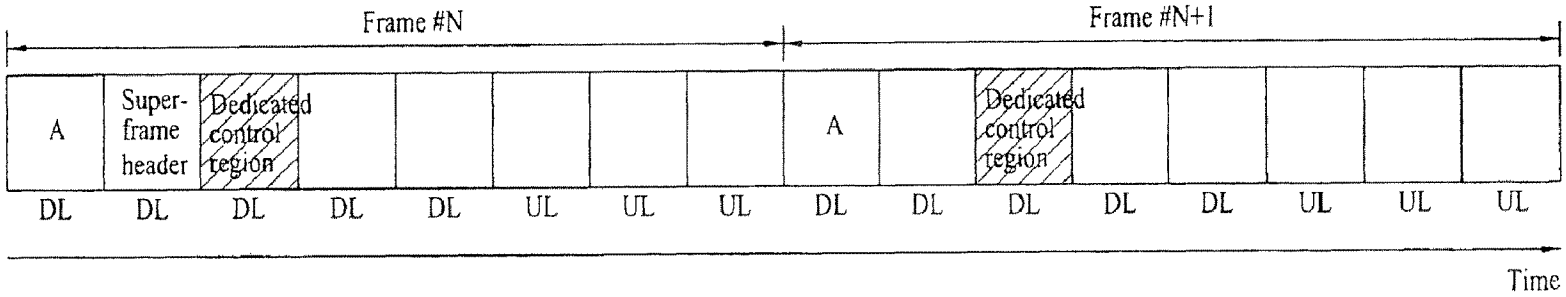
Figure 20E:
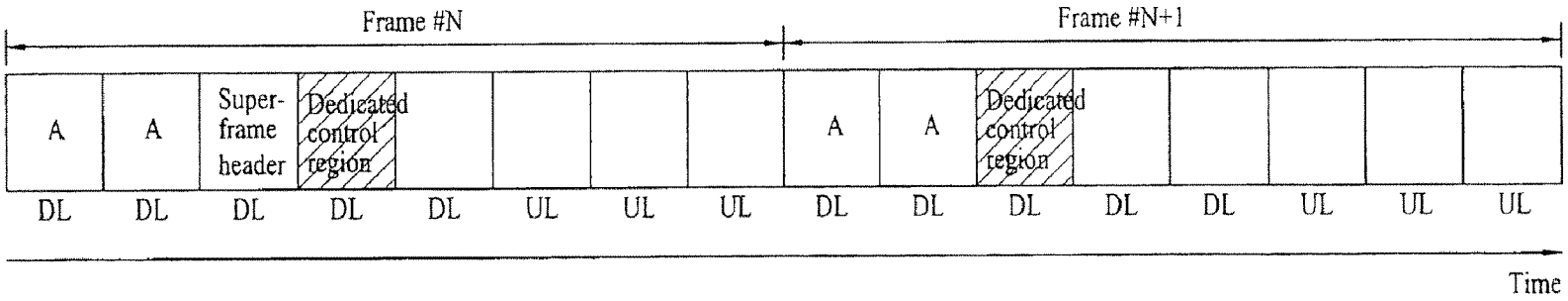
Figure 20F:
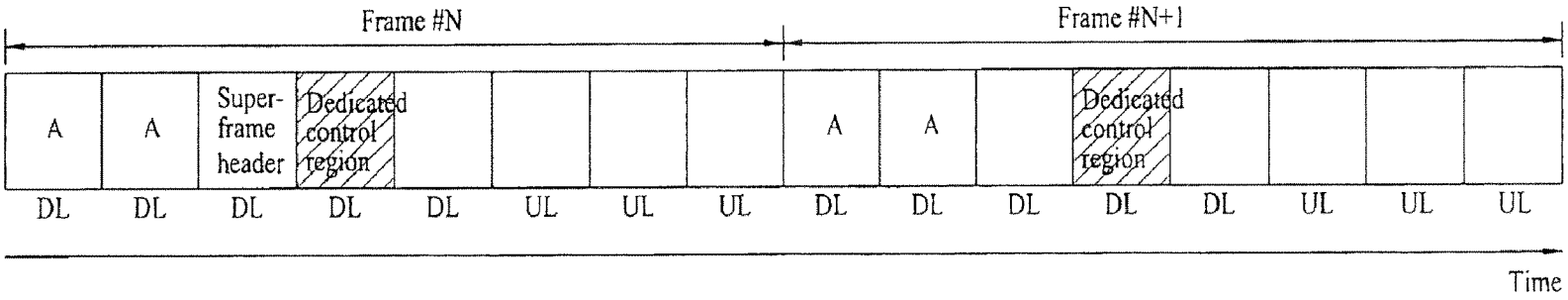
Figure 20G:
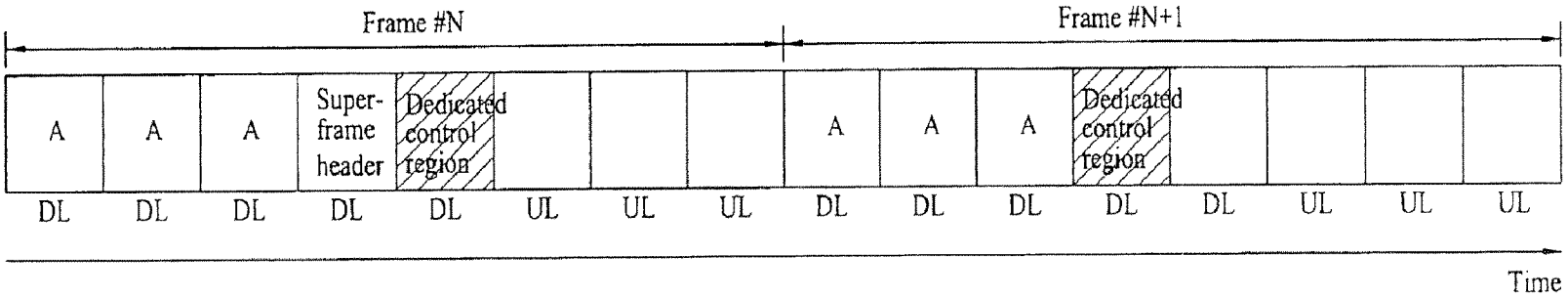
Figure 20H:
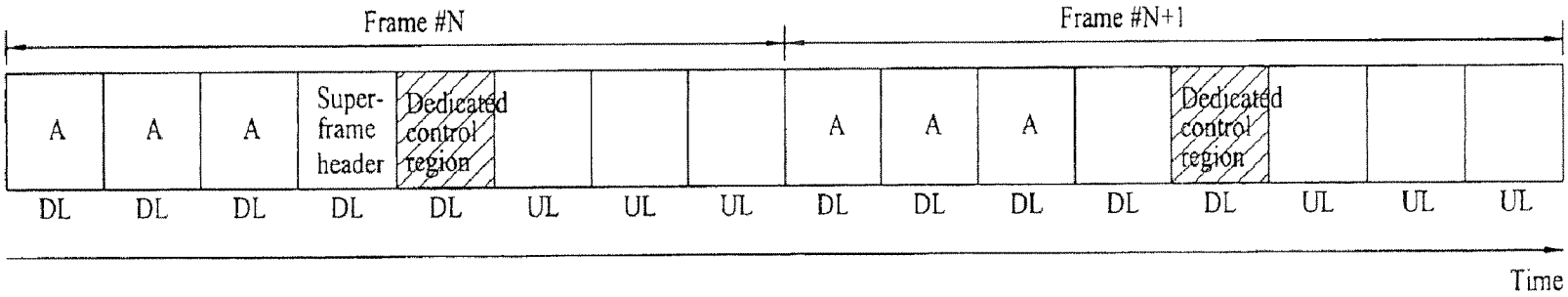

If the legacy region is arranged in a superframe region, the dedicated control region may be arranged at a subframe which does not overlap the legacy region. If the number of legacy regions is increased as illustrated in FIG. 19F, compatibility with the legacy user equipment is increased but a delay may be increased in a new user equipment supporting IEEE 802.16m, etc.

FIGS. 20A to 20H illustrate arrangements of a dedicated control region in a superframe of a TDD according to the present invention.

A superframe header includes a common control region and a preamble. The common control region may indicate how many subframes each dedicated control region manages.

A dedicated control region may be located not to overlap a subframe of a superframe header region.

A remaining region of the superframe header may be allocated for other purposes using a previous dedicated control region located before the superframe header. For example, if a multi-carrier is used, the previous dedicated control region may indicate a band which is not used as the superframe header.

Figure 21A:
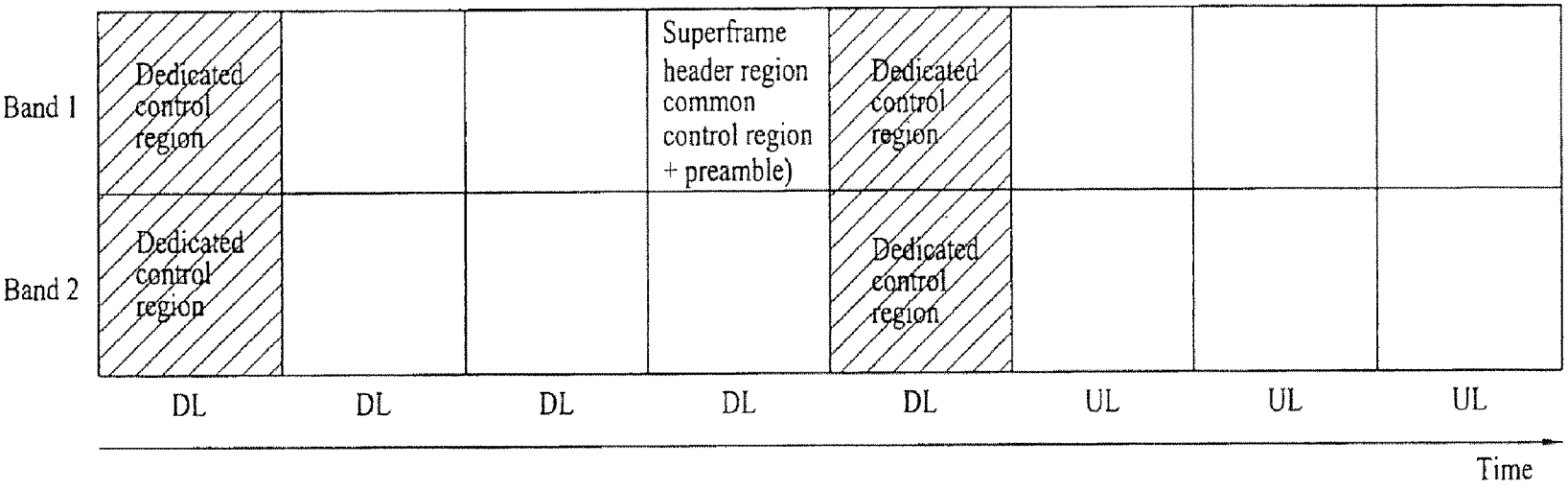
FIGS. 21A to 21C illustrate arrangements of a dedicated control region with respect to each band according to the present invention.
Figure 21B:
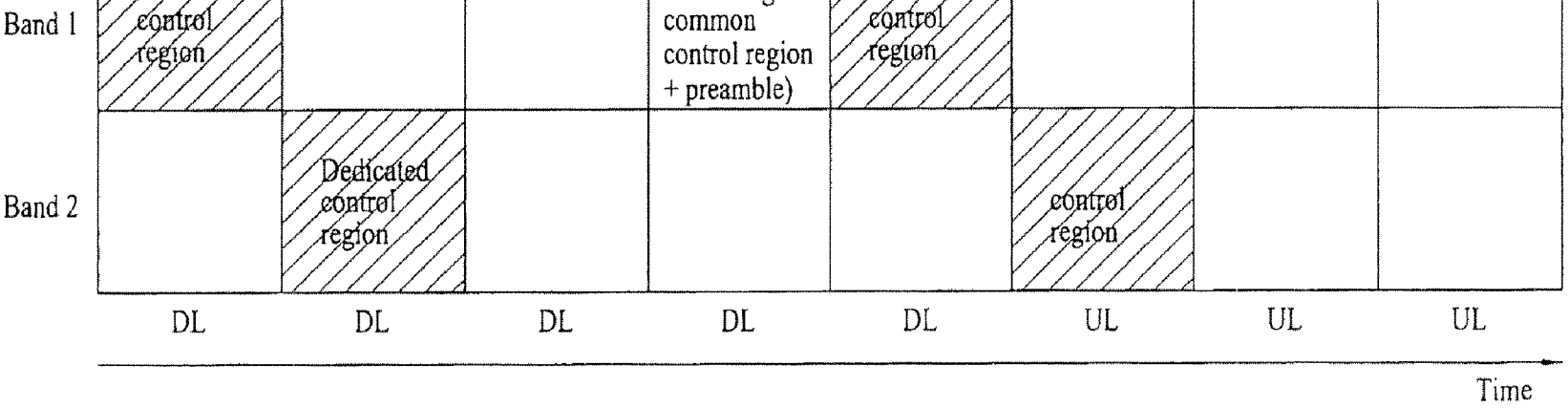
Figure 21C:
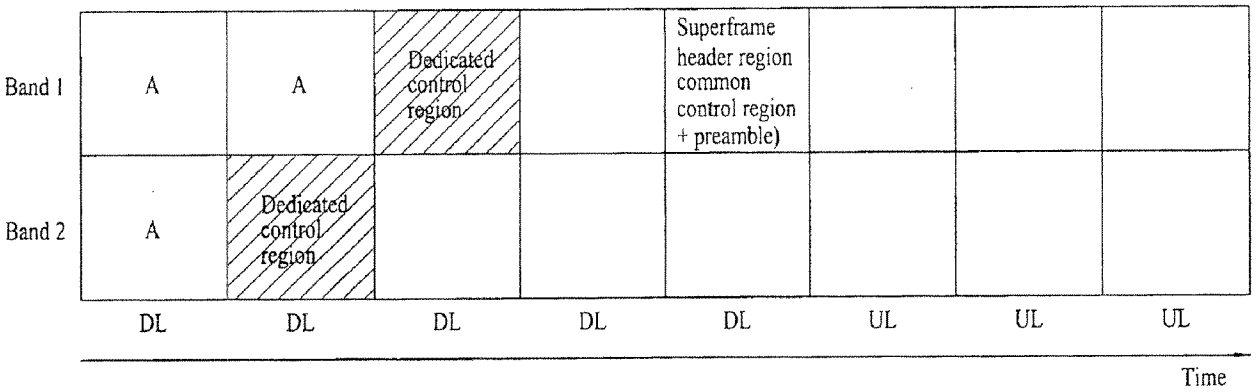

FIGS. 21A to 21C illustrate arrangements of a dedicated control region with respect to each band according to the present invention.

As illustrated in FIG. 21A, a specific band may not have a superframe header. A subframe preceding the second dedicated control region of a band 2 may be indicated by the first dedicated control region of a band 1 or the first dedicated control region of the band 2. Further, a location of the dedicated control region may be different according to bands as illustrated in FIG. 21B. In FIG. 21C, locations of legacy regions are different according to bands.

The arrangements of the dedicated control region may be combined with each other or may be modified to other forms.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The present invention provides a method for transmitting or receiving data using a superframe structure which is capable of reducing power loss and overhead and may be applied to devices such as a base station and a user equipment in a wireless access system such as IEEE 802.16m.

The invention claimed is:

[1. A method of transmitting data through a superframe, the method comprising:

generating the superframe, the superframe including a superframe header, a data region including user data, and a dedicated control region including resource allocation information for the data region, the resource allocation information being as to resources scheduled according to downlink channel information through the dedicated control region, wherein the superframe header includes a common control region, wherein the common control region includes first information as to a start location of the data region and second information as to a size of the data region, wherein the first information indicates a number of successive subframes between the dedicated control region and the data region, and wherein the second information indicates a number of successive subframes used for the data region; and transmitting the superframe.]

[2. The method according to claim 1, wherein the common control region includes a broadcast channel (BCH).]

[3. The method according to claim 1, wherein the number of successive subframes between the dedicated control region and the data region is 0 or more.]

[4. The method according to claim 1, wherein the number of successive subframes used for the data region is 1, 2 or more.]

[5. The method according to claim 1, wherein a feedback channel is located ahead of the dedicated control region by a prescribed number of subframes.]

[6. The method according to claim 1, wherein the dedicated control region is arranged at at least one location except for a subframe of the superframe header.]

[7. The method according to claim 1, wherein the dedicated control region precedes the superframe header and includes information allocating available resources between a location of the dedicated control region and a location of the superframe header to the data region.]

[8. The method according to claim 1, wherein the dedicated control region is arranged in at least one subframe except for a legacy region including a legacy preamble.]

[9. The method according to claim 1, wherein the dedicated control region is arranged in subframes which are different according to a band.]

[10. The method according to claim 1, wherein the common control region further includes information as to a location of a feedback channel through which channel information of a downlink is transmitted.]

[11. The method according to claim 1, wherein the superframe further includes 4 frames, each of the frames comprising 8 subframes, and each of the subframes including 6 Orthogonal Frequency Division Multiple Access (OFDMA) symbols.]

[12. A method for receiving data using a superframe which includes a data region including user data, a dedicated control region including dedicated control information for the data region, and a superframe header including a common control region, the method comprising:

receiving information as to a location of a feedback channel through the common control region;

transmitting downlink channel information through the feedback channel; and receiving resource allocation information as to resources scheduled according to the downlink channel information through the dedicated control region, wherein the common control region includes first information as to a start location of the data region and second information as to a size of the data region, wherein the first information indicates a number of successive subframes between the dedicated control region and the data region, and wherein the second information indicates a number of successive subframes used for the data region.]

[13. The method according to claim 12, wherein a number of successive subframes from a start location of a subframe at which the data region is started is changed according to information transmitted through the common control region.]

[14. The method according to claim 12, wherein the dedicated control region is arranged at at least one location except for a subframe of the superframe header.]

[15. The method according to claim 12, wherein the dedicated control region precedes the superframe header and includes information allocating available resources between a location of the dedicated control region and a location of the superframe header to the data region.]

[16. The method according to claim 12, wherein the dedicated control region is arranged in at least one subframe except for a legacy region including a legacy preamble.]

[17. The method according to claim 12, wherein the dedicated control region is arranged at locations of subframes which are different according to a band.]

[18. The method according to claim 12, wherein the superframe further includes 4 frames, each of the frames comprising 8 subframes, and each of the subframes including 6 Orthogonal Frequency Division Multiple Access (OFDMA) symbols.]

[19. The method according to claim 13, wherein the common control region includes a broadcast channel (BCH) .]

[20. The method according to claim 13, wherein the feedback channel is located ahead of the dedicated control region by a prescribed number of subframes.]

*21. A method of transmitting data through a transmission frame in a physical channel, the method comprising:*

*generating, by a station, the transmission frame to be transmitted in the physical channel, the transmission frame including a first part, a second part, and a third part,*

*wherein the first part includes information to access scheduled transmission data,*

*wherein the second part includes information to decode data units for carrying the scheduled transmission data,*

*wherein a size of the second part is variable and the first part includes information on the size of the second part,*

*wherein the second part includes first information and second information, wherein the first information indicates a start location of the data units for carrying the scheduled transmission data in the third part, and the second information indicates a number of the data units for carrying the scheduled transmission data in the third part, and*

*wherein the third part includes the data units for carrying the scheduled transmission data; and*

*transmitting, by a transmitter of the station, the transmission frame.*

* * * * *